(12) United States Patent
Teraoka et al.

(10) Patent No.: US 10,802,449 B2
(45) Date of Patent: Oct. 13, 2020

(54) SOLDERING SYSTEM POWER SUPPLY UNIT, CONTROL UNIT, ADMINISTRATION DEVICE, AND POWER SUPPLY-AND-CONTROL DEVICE

(71) Applicant: Hakko Corporation, Osaka (JP)

(72) Inventors: Yoshitomo Teraoka, Osaka (JP); Kenta Nakamura, Osaka (JP); Yasumasa Igi, Osaka (JP)

(73) Assignee: Hakko Corp. (JP)

( * ) Notice: Subject to any disclaimer, the term of this patent is extended or adjusted under 35 U.S.C. 154(b) by 444 days.

(21) Appl. No.: 14/450,051

(22) Filed: Aug. 1, 2014

(65) Prior Publication Data

US 2015/0246404 A1   Sep. 3, 2015

(30) Foreign Application Priority Data

Feb. 28, 2014   (JP) .................. 2014-038779

(51) Int. Cl.
  *B23K 1/00*   (2006.01)
  *G05B 15/02*   (2006.01)
  *B23K 3/08*   (2006.01)

(52) U.S. Cl.
  CPC ................ *G05B 15/02* (2013.01); *B23K 3/08* (2013.01)

(58) Field of Classification Search
  CPC . G05B 15/02; B23K 3/08; B23K 3/04; B23K 3/047; B23K 3/0473; B23K 3/0478
  USPC ...... 219/129, 130.01, 130.1, 130.21, 130.31, 219/130.32, 130.33, 130.4, 130.5, 130.51, 219/132, 134
  See application file for complete search history.

(56) References Cited

U.S. PATENT DOCUMENTS

| | | | | |
|---|---|---|---|---|
| 6,563,087 B1* | 5/2003 | Yokoyama | ............. | B23K 3/033 219/240 |
| 6,624,388 B1* | 9/2003 | Blankenship | ........ | B23K 9/1062 219/130.5 |
| 2004/0195292 A1* | 10/2004 | Tetuo | ..................... | B23K 3/033 228/51 |
| 2005/0103767 A1* | 5/2005 | Kainec | ..................... | B23K 9/10 219/130.5 |
| 2005/0121495 A1* | 6/2005 | Yokoyama | ........... | B23K 3/0478 228/9 |
| 2010/0308102 A1* | 12/2010 | Mochizuki | ............. | B23K 3/033 228/8 |

(Continued)

FOREIGN PATENT DOCUMENTS

| | | |
|---|---|---|
| CN | 2818053 B | 9/2006 |
| JP | US64-5772 | 1/1989 |

(Continued)

*Primary Examiner* — Justin C Dodson
(74) *Attorney, Agent, or Firm* — Paul B Abel

(57) ABSTRACT

The present invention is intended to ease the control and management of soldering devices, and enhance convenience. In accordance with the intention of the invention, a system includes a power supply unit having a connecting cable to be connected to soldering devices, a power supply portion supplying power to the soldering devices through the connecting cable, a power supply control portion to control the power supply from the power supply portion based on a temperature setting signal T(s) set in advance and a control unit that may be physically separated from the power supply unit but which inputs the temperature setting signal T(s) to the power supply control portion of the power supply unit.

13 Claims, 23 Drawing Sheets

(56) References Cited

U.S. PATENT DOCUMENTS

2011/0022862 A1* 1/2011 Nagao .................. G06F 1/266
                    713/310

FOREIGN PATENT DOCUMENTS

| | | |
|---|---|---|
| JP | A2009-166062 | 7/2009 |
| JP | A2010-64111 | 3/2010 |

* cited by examiner

FIG.23

| Voltage of identification signal | Soldering device | Setting program |
|---|---|---|
| 5.5V or above | Not connected | |
| 5.5 > V ≥ 4.5 | Hot air rework | Hot air rework setting program |
| 4.5> V ≥ 3.5 | Desoldering iron | Desoldering iron setting program |
| 3.5> V ≥ 2.5 | Tweezers | Tweezers setting program |
| 2.5> V ≥1.5 | Soldering iron | Soldering iron setting program |
| Less than 1.5V | Error | Error trap program |

SOLDERING SYSTEM POWER SUPPLY UNIT, CONTROL UNIT, ADMINISTRATION DEVICE, AND POWER SUPPLY-AND-CONTROL DEVICE

FIELD OF THE INVENTION

The present invention relates to a soldering system including a power supply unit, control unit, administration device, and power supply and control device.

In the electronics industry, even today, the task of soldering electronic components is often a manual operation. The soldering function is performed by setting the work area on a work bench. The worker will operate the soldering device facing the work area. The soldering devices may include soldering irons, desoldering irons, and tweezers but they are not limited thereto. The individual soldering device is connected to a power supply and control device. The power supply and control device controls the heat generation of the soldering device mainly by adjusting the voltage applied to the soldering device. Conventional power supply and control devices include a power supply portion supplying power to the soldering device, a power supply control portion controlling the voltage output from the power supply portion, a temperature setting portion for inputting a set temperature which is the control target of the power supply control section, a display for displaying the setting information of the temperature setting portion, and a housing for housing or enclosing the circuitry portions. The worker or operator operates the temperature setting portion while viewing the information displayed on the display. This operation includes a process to update or set the setting information to the temperature setting portion. The setting information is information related to conditions for determining the set temperature of the soldering device.

An example of the prior art soldering iron equipment is disclosed in Japan Patent Document JPA 2010-64111.

SUMMARY OF THE INVENTION

In conventional soldering iron equipment, the power supply portion and the unit to control the power supply portion have been physically integrated into the housing of the power supply and control device. Therefore, depending on the usage of the soldering iron equipment, there are various inconveniences.

For instance, because the display is attached and integrated in a housing, the housing must be placed on the work bench. If not, the operator cannot view the display. Therefore, there is a problem that the working area is reduced. On the other hand, higher output of the soldering devices has been requested in recent years. Providing a higher power output generally requires a bigger power supply portion. Responding to the demand for a higher output power supply specification, the power supply portion must be made larger, resulting in a larger size housing for the soldering iron equipment placed on the work bench, which further decrease the available working area.

The present invention is made in view of the above issues, and the object is to provide a power supply unit, control unit, administration device, and power supply and control device which give enhanced convenience.

To solve the above work bench space issue, the invention contemplates a power supply unit for a soldering system comprising a connecting portion connected to the soldering device, a power supply portion supplying power to the soldering device through the connecting portion, a power supply control portion to control the power supply from the power supply portion based on a temperature setting signal set in advance, wherein the power supply unit comprises a power supply side communication member providing communication with the power supply, the communication member receiving the temperature setting signal from equipment physically separated or separable from the power supply unit. When the power supply side communication member receives the temperature setting signal from the separable equipment, it is configured to input the temperature setting signal to the power supply control portion. In this embodiment, based on the control of the power supply control portion, the power supply unit may supply power to the soldering device connected to the connecting portion. The power supply control portion controls the above power supply based on the temperature setting signal set in advance. The temperature setting signal is provided by equipment physically separated or separable from the power supply unit. The temperature setting signal is input to the power supply control portion through power supply communication member. Therefore, the equipment outputting the temperature setting signal does not necessary have to be physically located at the same place as or with the power supply unit. Thus, the power supply unit may be placed away from the work bench, for example, under the workbench.

BRIEF EXPLANATION OF THE DRAWINGS

FIG. 23 is a judgment table for the control unit.

DETAILED DESCRIPTION OF THE PREFERRED EMBODIMENT

The following describes the best known system to achieve the invention with reference to the accompanying drawings. Those skilled in the art may appreciate alternative configurations for the concept following review of this specification. Accordingly, the description herein is intended to be exemplary, but not limiting with respect to the proper scope of the appended claims.

Figure 1:
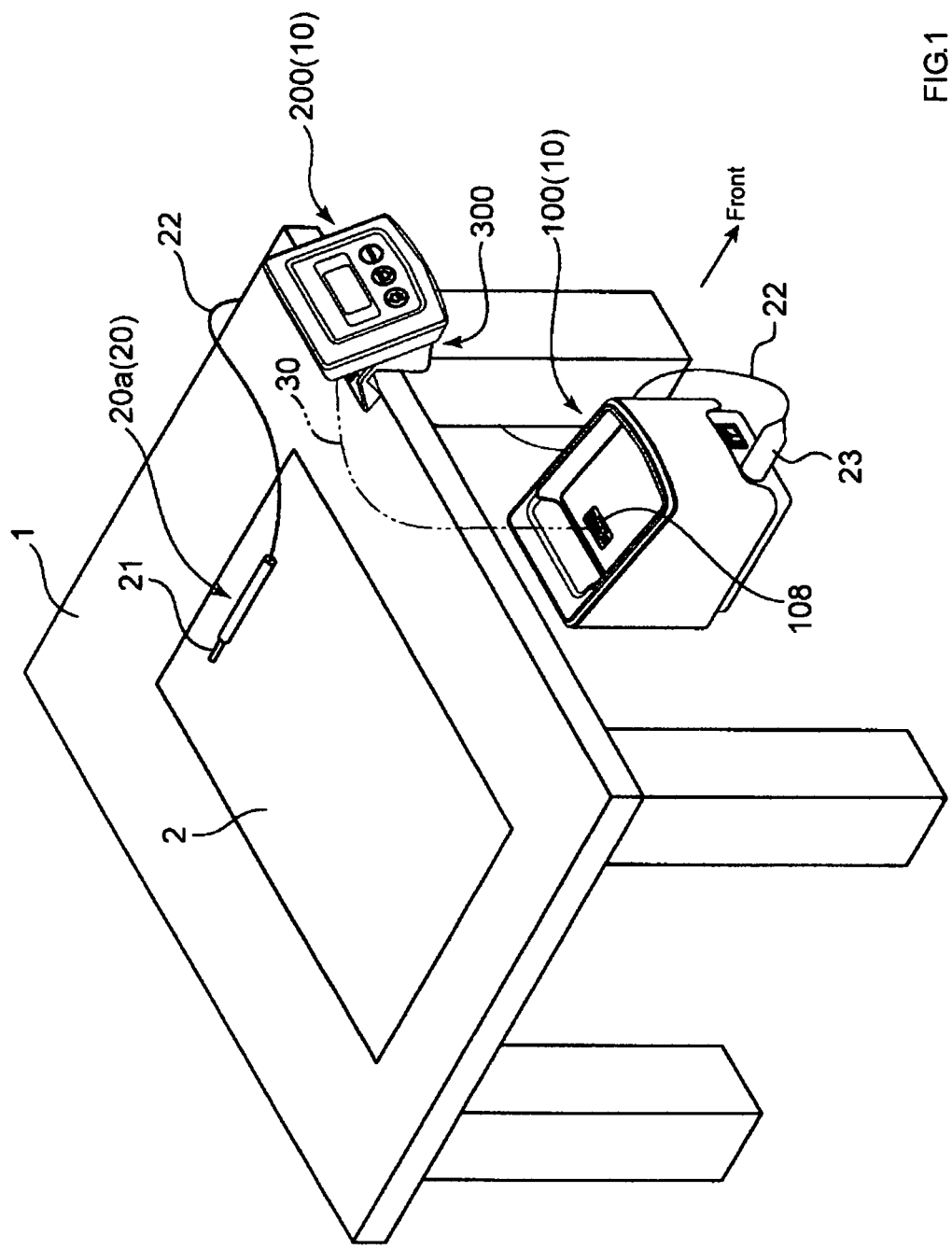
FIG. 1 is a perspective view showing an example of a soldering system including a power supply and a control unit or device located at a work station according to an embodiment of the present invention.
Figure 2:
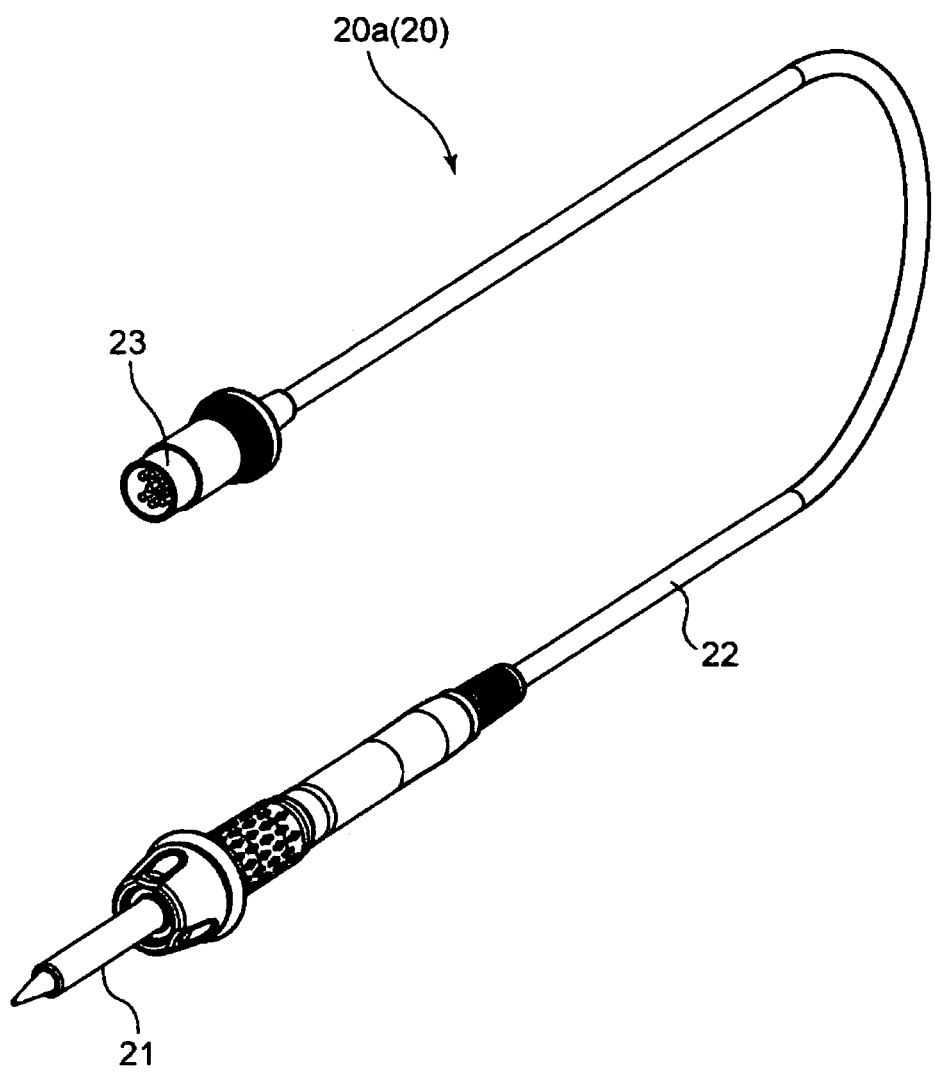
FIG. 2 is a perspective view showing an example of a soldering device that is to be connected to the power supply of FIG. 1.

Referring to FIG. 1, illustratively shown but not limited thereto, soldering system 10 comprises a power supply unit 100 and a control unit 200 that are configured to control a plurality of types of soldering devices 20. Power supply unit 100 and control unit 200 are to be used at a work bench 1 where the solder handling operation is being worked. On the work bench 1, a working mat 2 may be provided. An operator will work or perform soldering or desoldering operations on the working mat 2. At the side of the working mat 2, the soldering device 20 may be placed in a holder (not shown). As illustrated in FIG. 2, the soldering device 20 may be a soldering iron 20a. In the illustrated example, the soldering device 20 is equipped with a soldering tip unit 21, a cable 22 to supply power to the soldering tip unit 21, and a connector 23 provided at the opposite end of the cable 22. Soldering device 20 is connected to the power supply unit 100 via said connector 23 and through the power supply unit 100 it is connected to the control unit 200 according to the depicted embodiment. The power supply unit 100 and control unit 200 control the power supply to the soldering device 20.

The soldering system 10 preferably includes the power supply unit 100 and the control unit 200. As illustrated, the control unit 200 is configured as a device that is able to be physically separate from the power supply unit 100. The details of each part will be described below.

Figure 3:
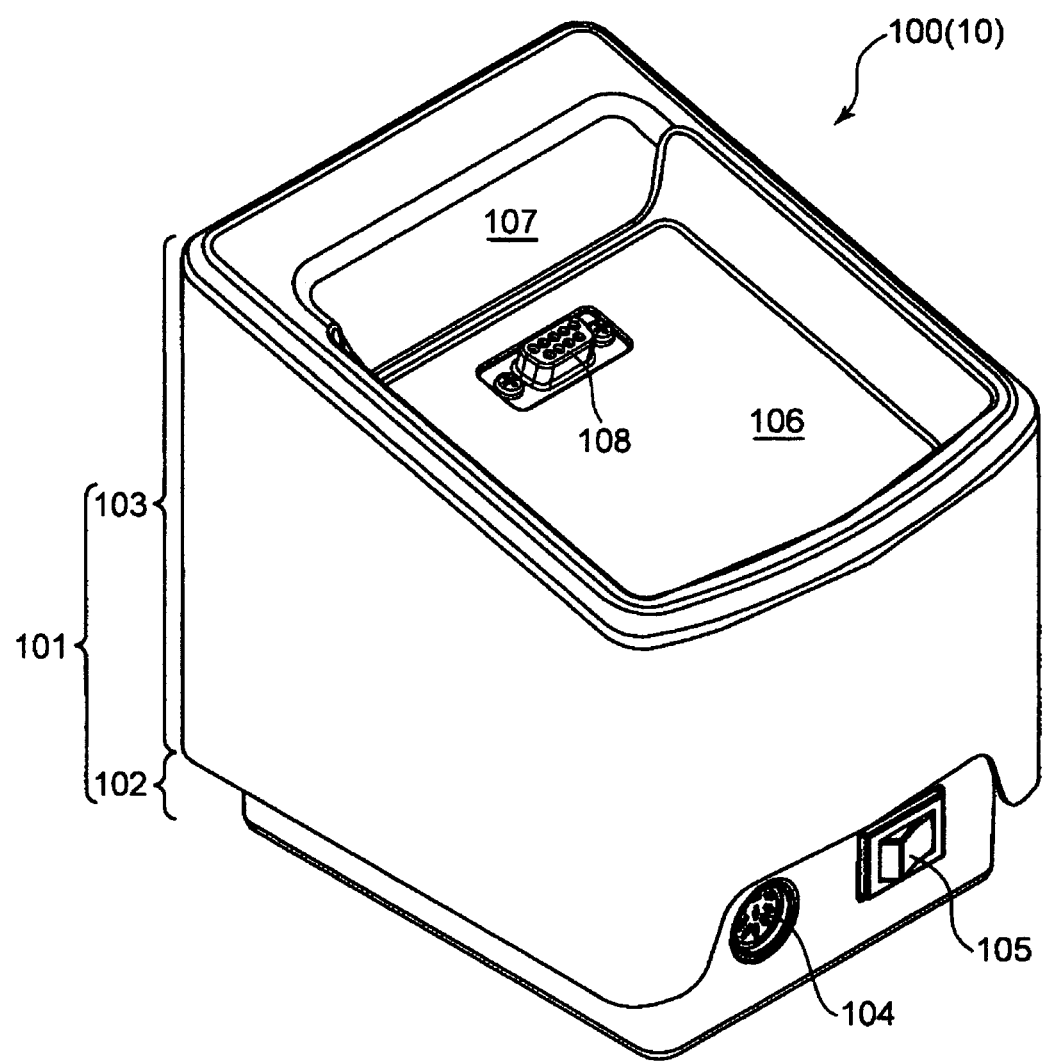
FIG. 3 is a perspective view showing the power supply unit which is a component of the soldering system of FIG. 1.
Figure 4:
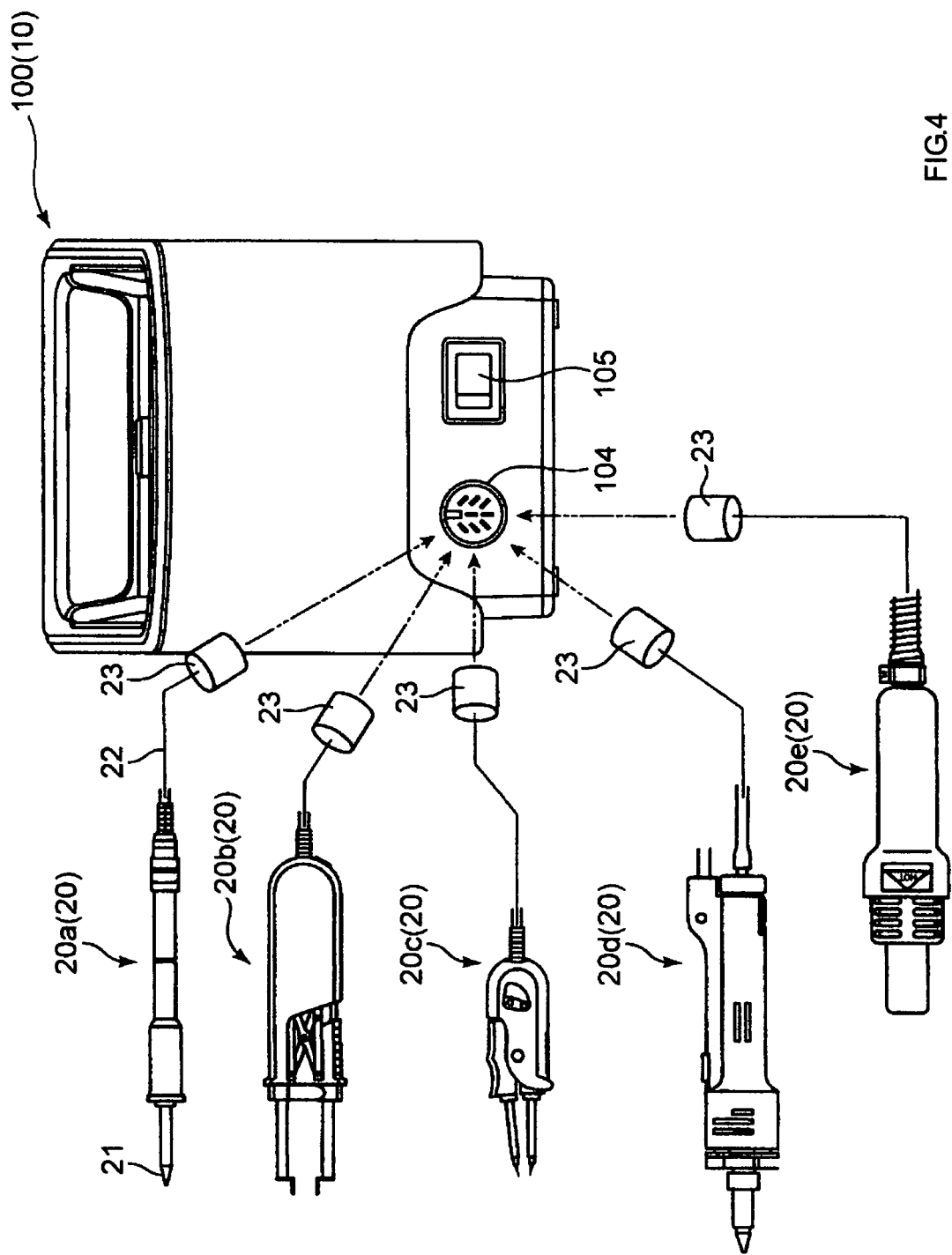
FIG. 4 is an illustration view of exemplary types of soldering devices that may be connected to the power supply of FIG. 1.

Referring to FIG. 3 and FIG. 4, the power supply unit 100 include a box shaped housing 101. The housing 101 is made of molded resin, and assembled with other parts, it integrally includes a bottom housing 102 and a top housing 103 which overhangs on the top of the bottom housing 102. In front of the bottom housing 102, a connector 104 is provided which is to be connected with the connector 23 of the soldering device 20. The connector 104 is an example of the connecting portion according to the invention. The connector 104 is configured to be connected alternatively with multiple types of soldering devices 20 that are connectable with the connector 104.

Other than the soldering iron 20a shown in FIG. 2, examples of the different types of soldering devices 20 include tweezers 20b, micro tweezers 20c, a desoldering iron 20d, and a hot air rework 20e, as illustratively shown in FIG. 4. Each soldering device 20 (20a to 20e) includes a common specification connector 23 that is connectable to connector 104. Therefore, the operator could select the appropriate soldering device 20 depending on the task of the operation, and connect it to the power supply unit 100. Further, each soldering device 20 includes a temperature sensor for detecting the temperature at each heating unit, such as in the operating end of the soldering tip unit 21. The output of the temperature sensor is input into the power supply unit 100 via connector 23 through connector 104. Still further, different resistance value resistors are incorporated in each soldering device 20 to uniquely identify the type of soldering device 20. Accordingly, each type of soldering device 20 is configured to provide a specific identification current flow at a different voltage that may be used to identify the type of soldering device 20. Further details of the soldering device 20 as briefly described above are disclosed in detail in JPA2005-169428 and U.S. Publication no. 2005/0121495 A1, also filed by the applicant and hereby incorporated by reference.

Also, next to the connector 104, a power switch 105 for the power supply unit 100 is provided.

As shown in FIG. 3, the power supply unit 100 has a housing 103 that generally has the shape of a cube including a top portion where its front side is inclined downward. On the top portion of the top housing 103, a rectangular recess 106 is formed. One side of the recess 106 is partially recessed backward forming a step portion 107. Recess 106 is formed for attaching and detaching the control unit 200. At the bottom surface of the recess 106, a connector 108 is provided. Through the connector 108, the power supply unit 100 is communicatively coupled to the control unit 200. Alternatively, the power supply unit 100 and control unit 200 may communicate via wireless transmissions, as described further below.

Figure 5:
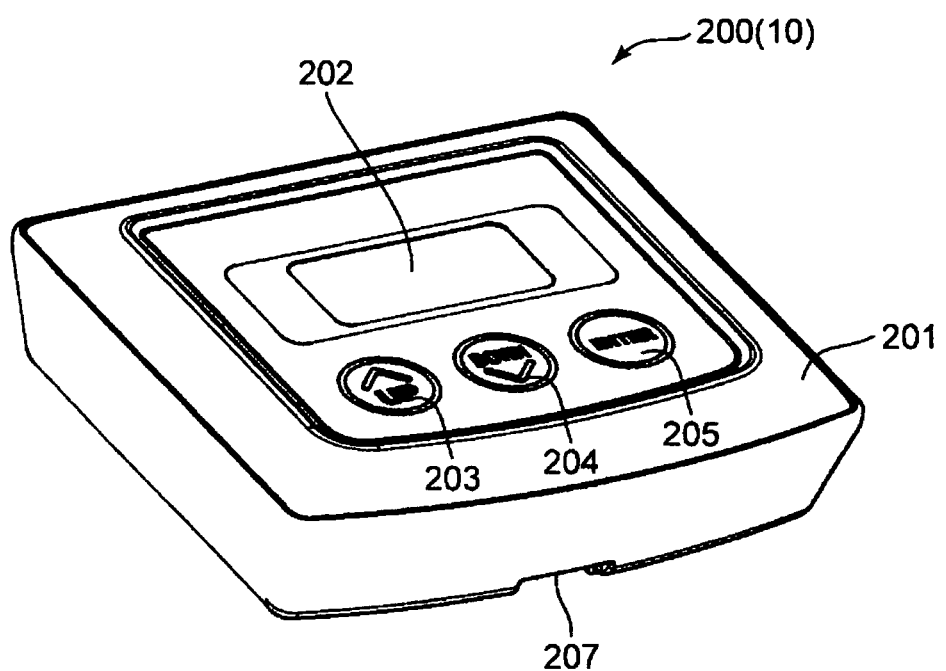
FIG. 5 is a perspective view showing the control unit for the power supply of FIG. 1 from the front side.
Figure 6:
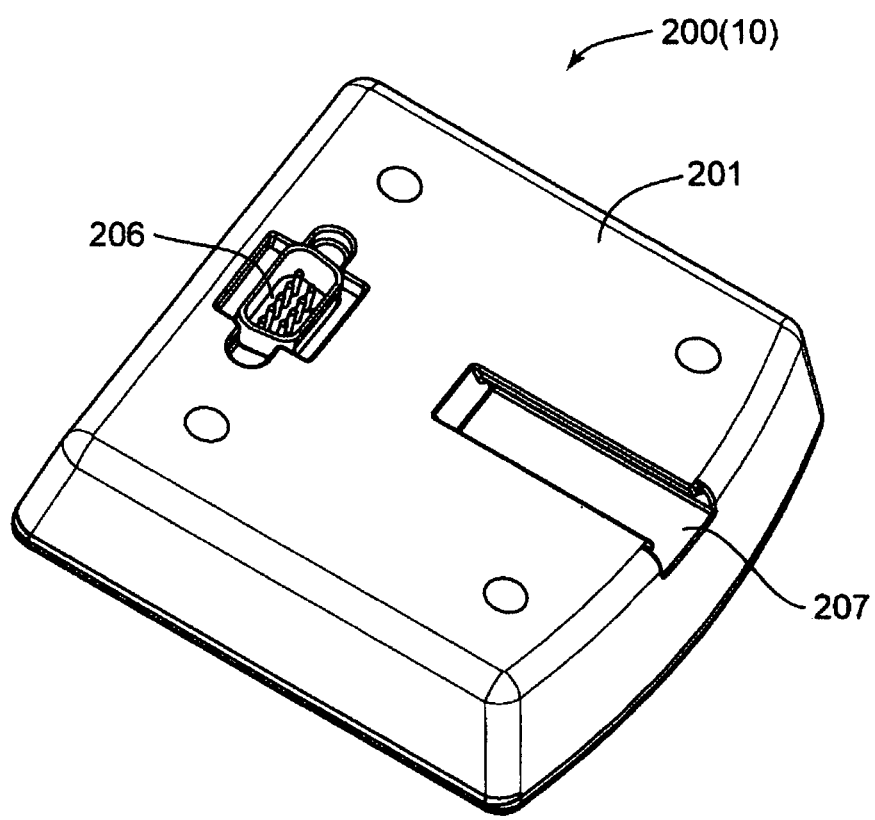
FIG. 6 is a perspective view showing the control unit for the power supply of FIG. 1 from the back side.

Now referring to FIG. 5 and FIG. 6, the control unit 200 includes a resin made housing 201. The housing 201 is generally cube shaped and having a rectangular shape configured to fit within the contours of a recess 106 in the top surface of the power supply unit 200. A display 202 is provided on the planner face of the housing 201 of the control unit 100. The display 202 is embodied for example, by a LED display. On the planner face of the housing 201 below the display 202 (lower side of FIG. 5), operation buttons 203 to 205 are arranged. The operation buttons are embodied by an UP button 203 for instructing to raise the set temperature, a DOWN button 204 for instructing to lower the set temperature, and an ENTER button for instructing an "enter" or "set" command. These operation buttons 203 to 205 are electrically connected to a feedback control circuit portion 212, which will be later described. The feedback control circuit portion 212 is able to change the set temperature according to the output from the operation buttons 203 to 205. However, as will be described in detail later, the feedback control portion 212 is configured such that it could be locked with a password. Therefore, unless the password is entered under certain conditions, the set temperature cannot be changed using the operation buttons 203 to 205.

As shown in FIG. 6, a connector 206 is provided on the bottom surface of the control unit 200. When the control unit 200 is fitted in the power supply unit 100, the connector 206 is connected with the connector 108 of the recess 106. The connectors 206 and 108 may be directly coupled or they may be coupled via a cable. When the connectors 206 and 108 are coupled, the power supply unit 200 may charge a battery (not shown) inside of the control unit 200 to allow wireless interaction.

Figure 7:
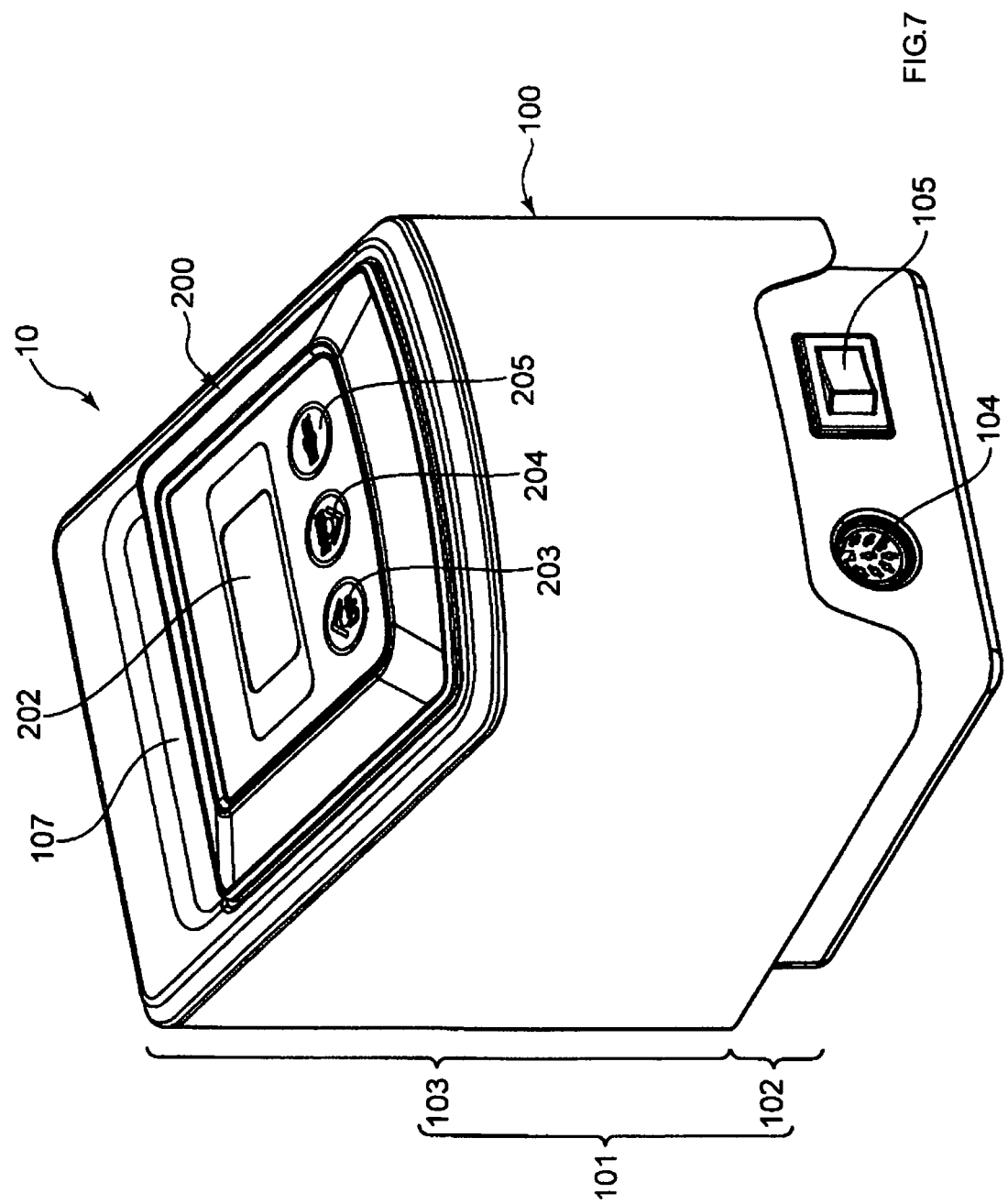
FIG. 7 is a perspective view of the power supply and control unit of FIG. 1
Figure 8:
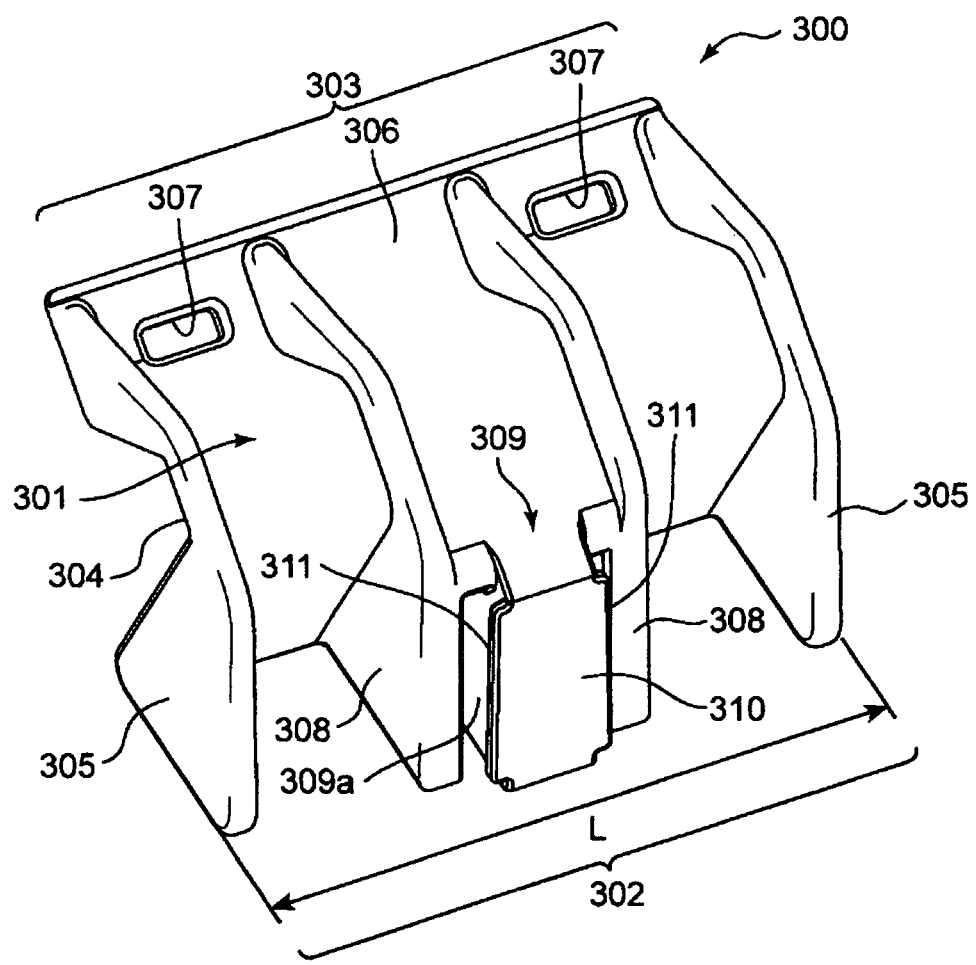
FIG. 8 is a perspective view of a stand for the control unit looking from the top side.

Referring to FIG. 7, when placing the control unit 200 in the recess 106 of the power supply unit 100, the bottom of the control unit 200 sits in the recess 106 of the housing 201. The top part of the control unit 200 (where the display 202 and the operation buttons 203 to 205 are arranged) slightly protrudes upward of the recess 106 facing out. A step portion 107 defines a gap to release a part of the control unit 200 fitted into the recess 106, so that by putting a finger into the gap defined by the step portion 107, an operator can remove the control unit 200 from the recess 106.

When the work bench 1 shown in FIG. 1 is large enough, the operator can place the power supply unit on the work bench 1 with the control unit 200 fitted in, and use it. However, in general, there are many types of other apparatus that may need to be placed on the work bench 1, such as a solder feeding device, solder reel and reel stand, and tip maintenance unit. Therefore, sometimes it is hard to have sufficient space to work on the work bench 1. In such case, the power supply unit 100 may be placed beneath the working bench 1. If the control unit 200 is mounted to the power supply unit 100, the visibility of the control unit 200 is deteriorated, and operation of the control unit 200 becomes inconvenient. Therefore, as shown in the embodiment of FIG. 1, it is beneficial to remove the control unit 200 from the power supply unit 100, and place the control unit 200 on or above the work bench 1 at a place where it has good visibility.

In the example shown in FIG. 1, a configuration which includes a stand 300 which is attached to the work bench 1 that allows the control unit 200 to be mounted and removed from the stand 300 is depicted.

With reference to FIGS. 8 to 11, the stand 300 is made of molded resin. The main body 301 of the stand 300 has a dogleg bent side shape. The main body 301 has a first end portion 302 and a second end portion 303. The first end portion 302 and the second end portion 303 define there between a bent concave portion 304. In the following description, a protruding side of the main body 301 opposite the concave portion 304 will tentatively be the front. Also, the second portion 302 side will tentatively be the bottom side (See FIG. 10).

The main body 301 has a pair of side flange 305 which also serves as reinforcement. The side flange 305 is a side wall which protrudes outward overall more than the main body 301. Width L of the main body 301 is adapted to the width of the control unit 200.

Regarding the side flange 305, the part which covers the first end portion 302 is formed in an outwardly widened substantially trapezoidal shape with the bottom side protruding to the front side from the main body 301. Top portion of the trapezoidal part extends parallel to the tangential direction of the bent concave portion 304. The end of the top portion integrally continues to cover the second end portion 303. The part covering the second end portion 303 is formed in a trapezoidal shape with the bottom side widened and protruding outward from the main body 301. Height H1 of the part covering the second end portion 303 is set to be lower than the height H2 of the part of the side flange 305 covering the first end portion 302.

The end part of the side flange 305 is continuous with the flange 306, formed between the pair of the side flanges 305. The flange 306 is an example of a flange according to the invention. At the flange 306, a pair of elongated holes 307 is formed arranged along the longitudinal direction. The elongated hole 307 may be used to insert a fastening member such as a screw or bolt to attach the stand 300 to a work bench 1 or a nearby wall.

Between the two side flanges 305, a pair of reinforcement ribs 308 generally having the same shape as the side flanges 305 may be integrally formed. Side flanges 305 and reinforcement ribs 308 are disposed roughly about the same distance apart. Further, one of the elongated holes 307 is formed between one of the side flanges 305 and one of the reinforcement ribs 308 facing this side flange 305. The other elongated hole 307 is formed between the other side flange 305 and the other reinforcement rib 308 facing the side flange 305.

Between the two reinforcement ribs 308, a holder 309 is provided which projects outward from the first end portion 302 is integrally formed. The holder 309 is an example of a support according to the invention. The holder 309 has a rectangular plate 310 extending vertically. On both sides of the plate 310, a slide rail 311 may be integrally formed along the longitudinal direction respectively. Slide rails 311 are merely examples that may be used with the invention.

Figure 9:
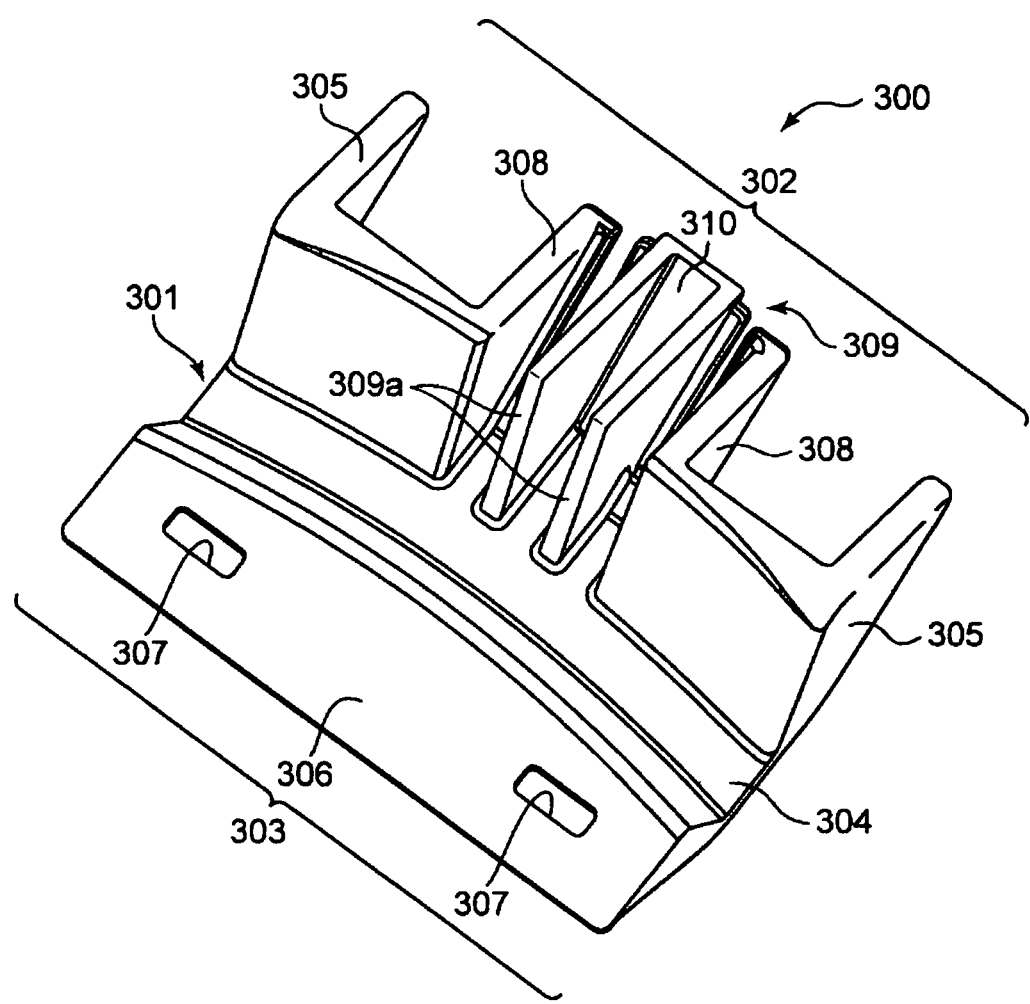
FIG. 9 is a perspective view of the stand for the control unit looking from the bottom side.

As shown in FIG. 9, the stand 300 includes a wall 309a. The wall 309a protrudes slightly outward as compared to the reinforcement ribs 308. The wall 309a is integrally continued with the side of the plate 310, and thus slightly outward more than the edge of the reinforcement ribs 308.

Figure 10:
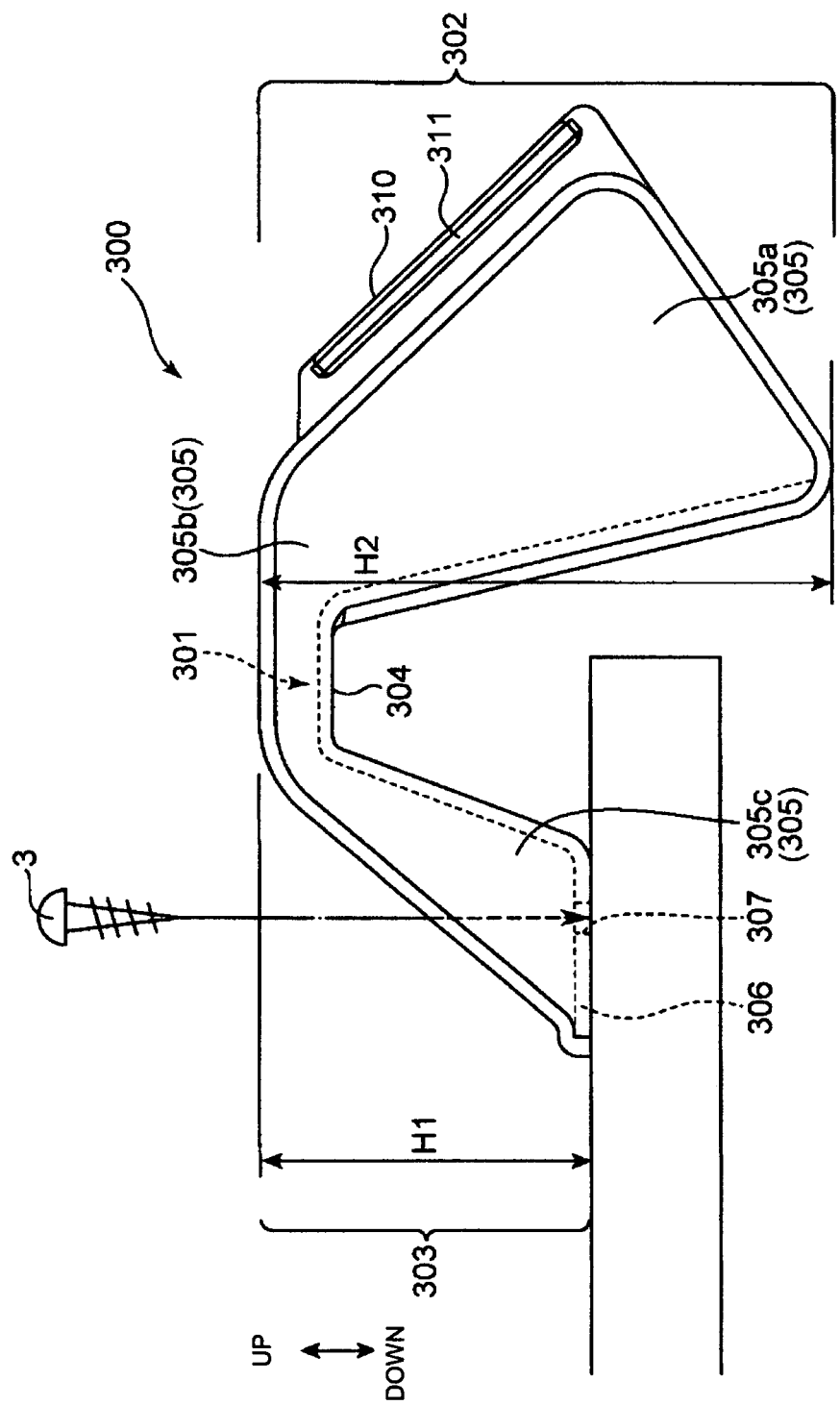
FIG. 10 is an enlarged view showing the mounting portion of the stand from the side surface of the stand for the control device of FIG. 1.
Figure 11:
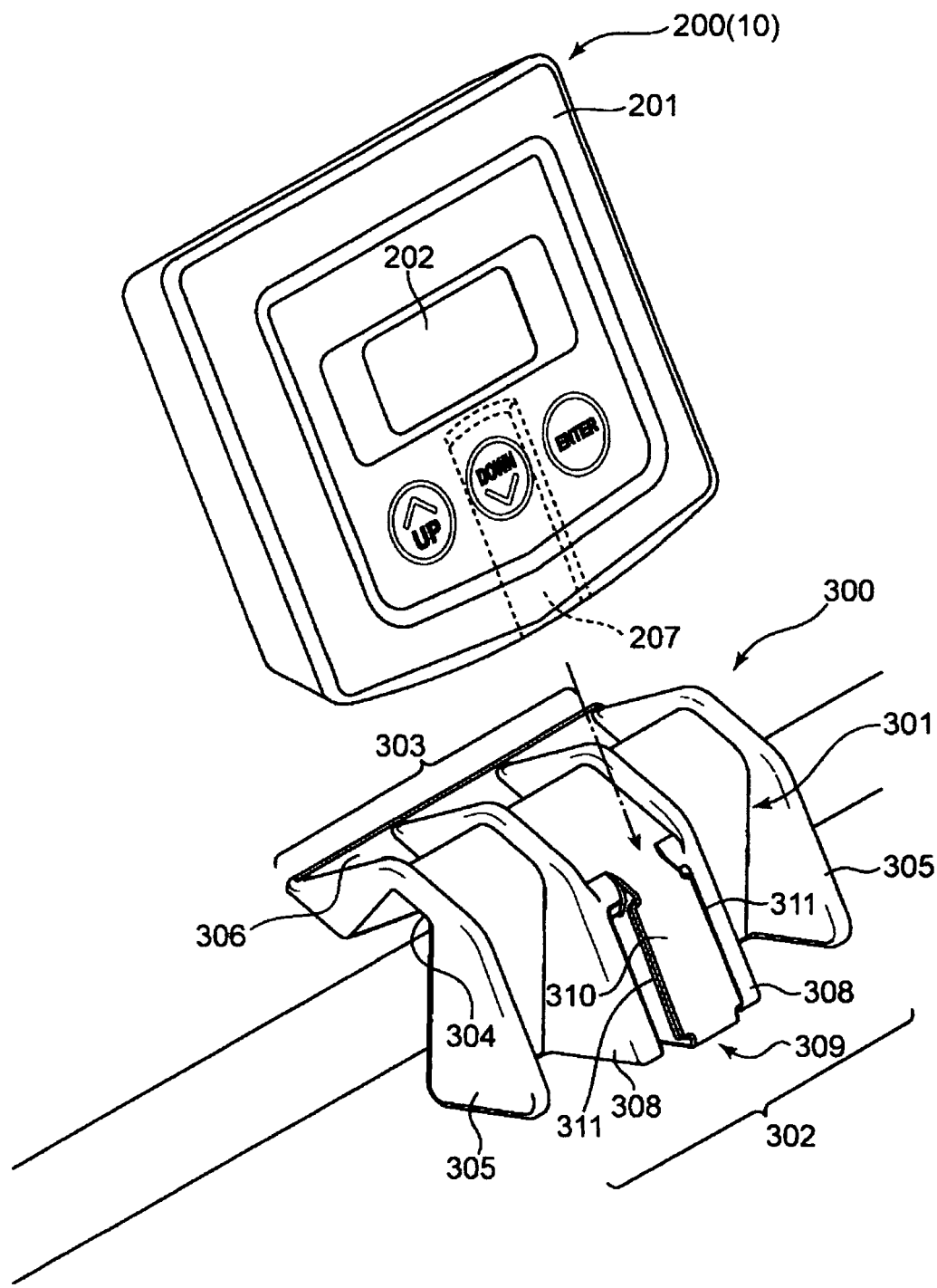
FIG. 11 is a perspective view showing the relation between the stand and the control unit.

Referring FIG. 1, FIG. 10, FIG. 11, the stand 300 is fixed in a manner with the first end portion 302 protruding out from the edge of the work bench 1, by placing the flange 306 on the work bench 1 and fixing it with a screw 3 inserted through the elongated hole 307. In this case, the holder 309 of the stand 300 has an inclined position with the lower side projecting forward.

On the other hand, as shown in FIG. 6 and FIG. 11, on the back of the housing 201 of the control unit 200, a groove 207 is formed with the lower side open ended. The lateral cross section of the groove 207 is undulated, adapted to the lateral cross section of the plate 310 including the slide rail 311. Thus, by inserting the plate 310 of the holder 309 into the groove 207 of the control unit 200, the control unit 200 is held detachably against the holder 309 of the stand 300. Therefore, the control unit 200 is attached to the front of the work bench 1. Depending on the work environment, such as when the operator is standing or sitting during operation, the ease of operation of the control unit 200 differs. However, by attaching the control unit 200 as described above, the operator could easily view the display 202 of the control unit 200 at any work environment. Therefore, the work efficiency is improved.

As shown in FIG. 1, when the control unit 200 is used separated from the power supply unit 100, a communication member 30 is used to ensure communication between them. In the illustrated example, the communication member 30 is a cable connecting the connector 108 to connector 206. However, the communication member 30 providing communication between the power supply unit 100 and the control unit 200 may be configured as a wireless system with a known wireless standard such as by Bluetooth® or Wifi.

Figure 12:
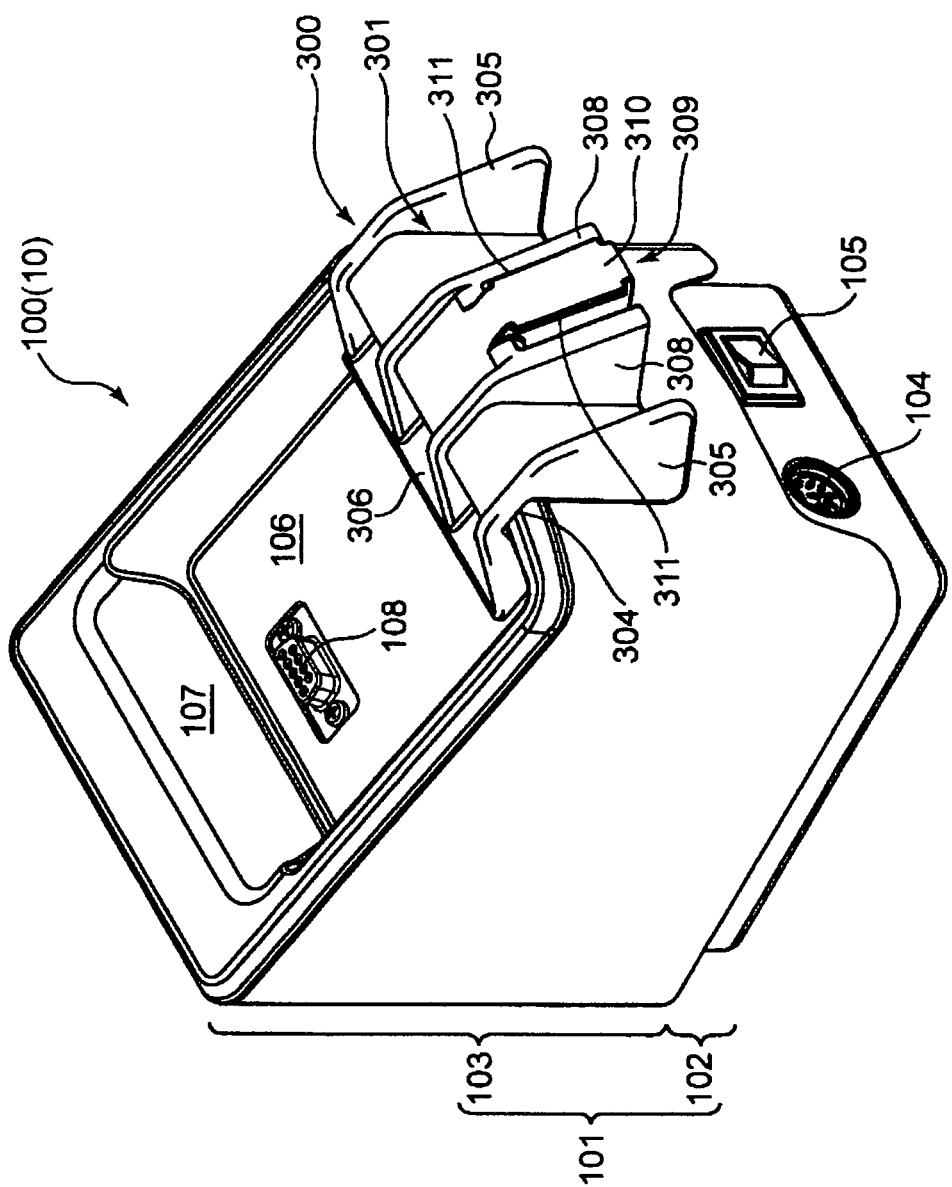
FIG. 12 is a perspective view showing the stand mounted to the power supply unit to receive the control unit of FIG. 1

In addition to the above described configuration, the stand 300 may also be mounted on the recess 106 of the power supply unit 100 as shown in FIG. 12.

As mentioned before, the stand 300 has a main body 301 that defines a bent concave portion 304. As shown in FIG. 12, the stand 300 may be mounted on the front of the power supply unit 100 on its recess 106 by putting the second end portion of the stand 300 into the recess 106, so the bent concave portion 304 engages to the front part of the recess 106.

Figure 13:
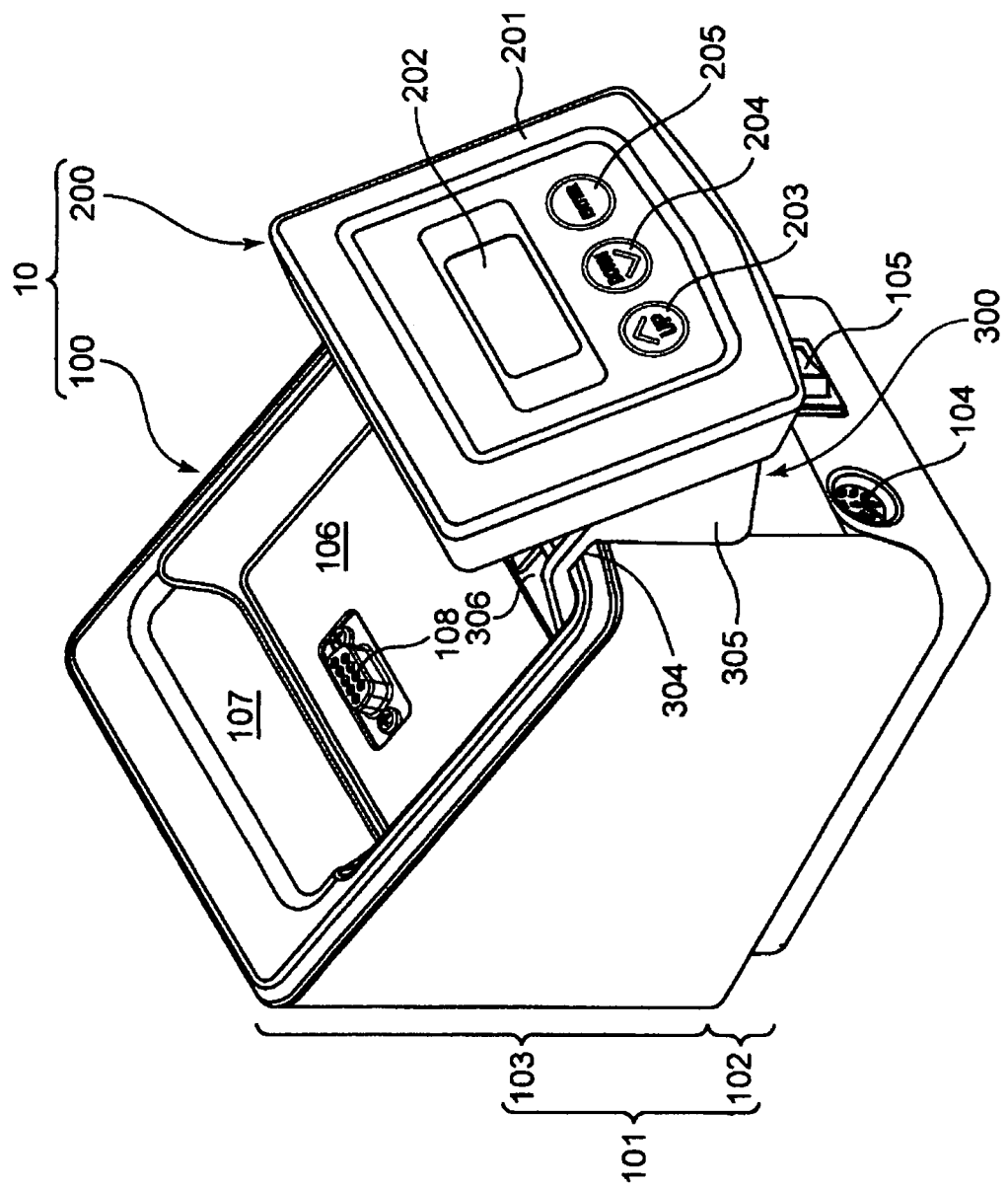
FIG. 13 is a perspective view showing the control unit mounted to the stand of FIG. 12.

Therefore, it is possible to keep the control unit 200 in an inclined position in front of the power supply unit 100, and enhance visibility and operability as shown in FIG. 13.

Figure 14:
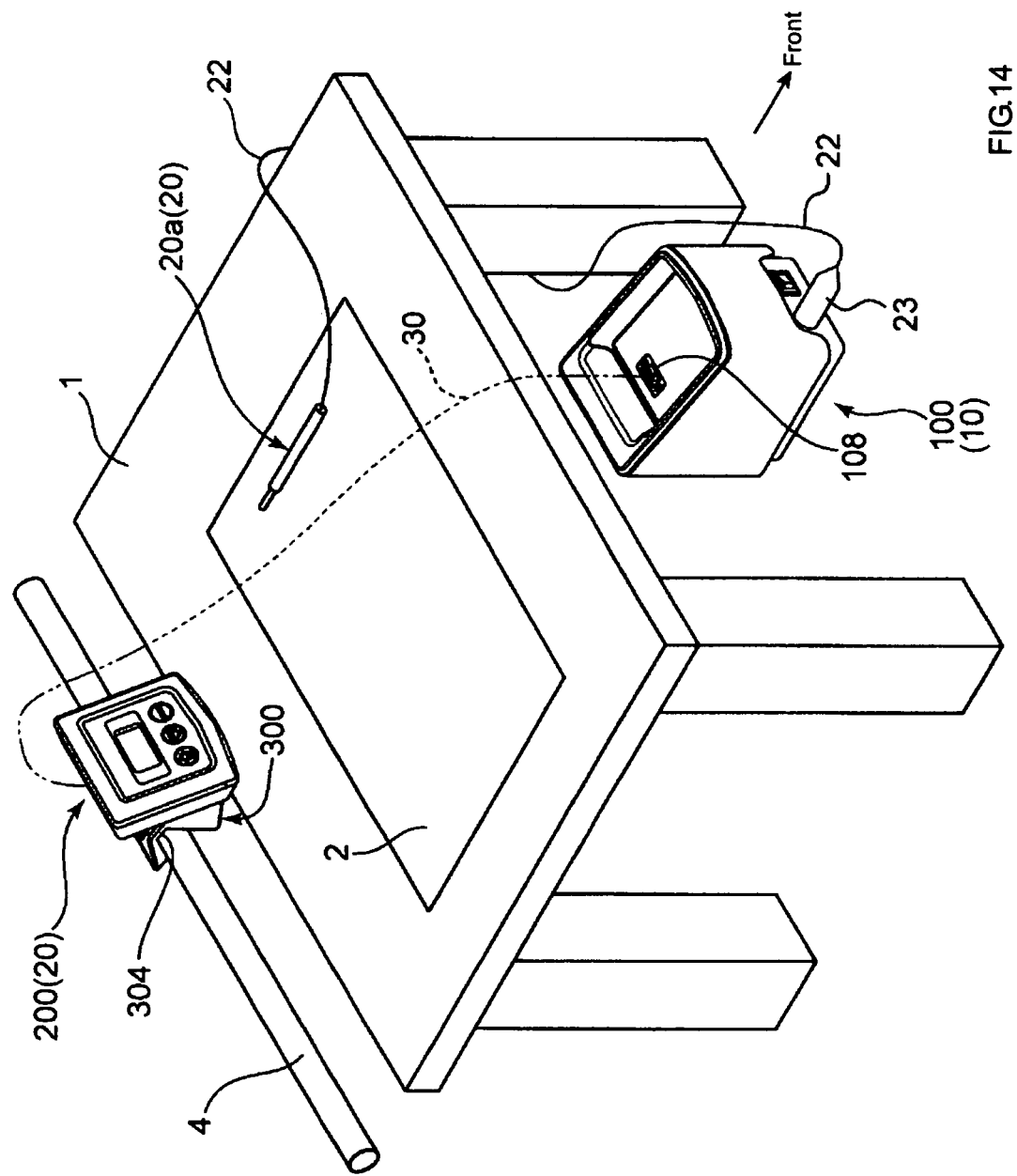
FIG. 14 is a perspective view showing another usage embodiment of the power supply and control unit of FIG. 1 at a work station.

Further as shown in FIG. 14, the stand could be secured to a bar 4 installed on the top of the work bench 1, by using the bent concave portion 304 of the stand 300, and the control unit 200 may then be attached to the stand 300.

Next, the electrical configuration of the power supply unit 100 and the control unit 200 will be explained with reference to the circuit block diagram of FIG. 15.

Figure 15:
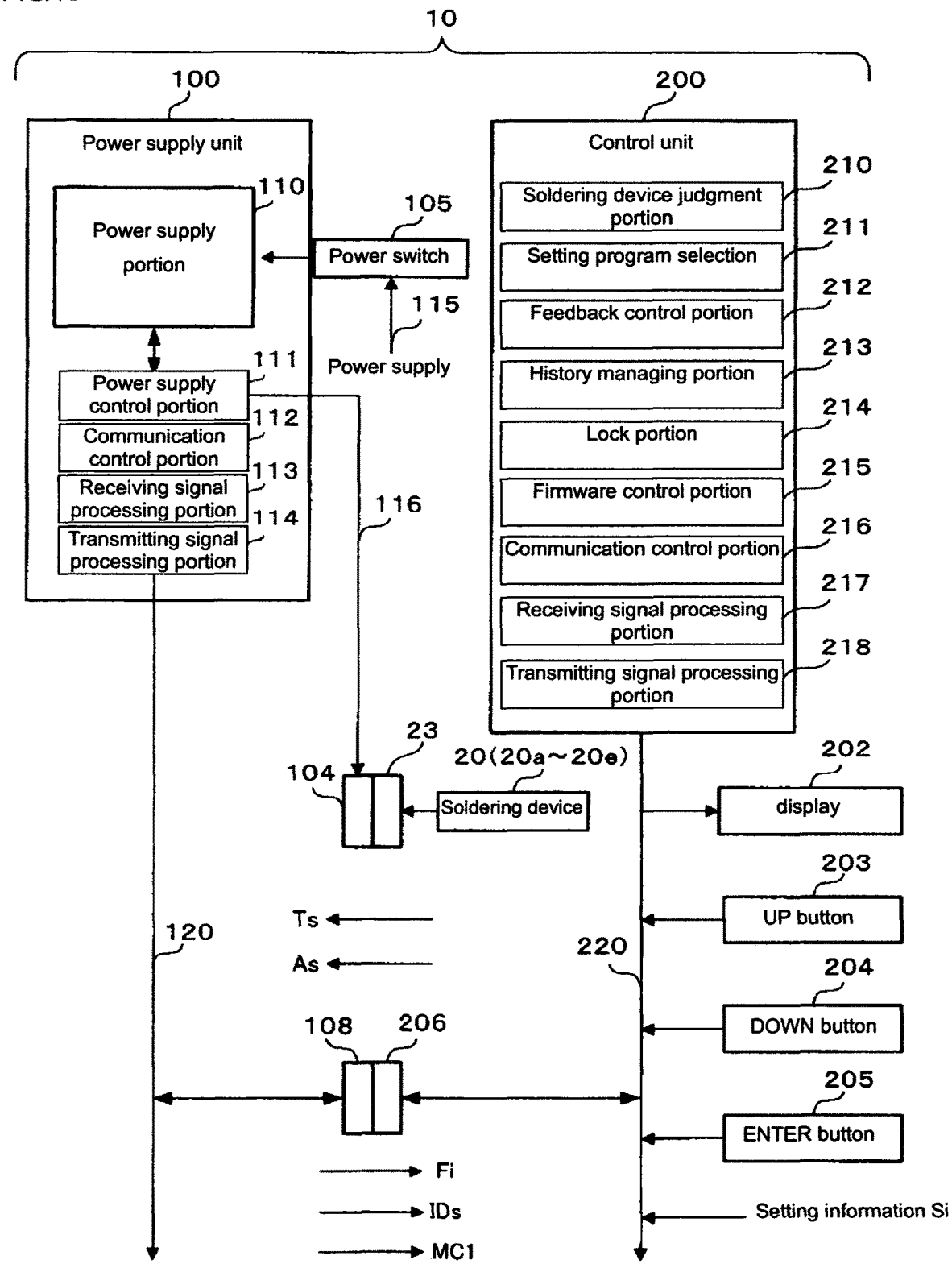
FIG. 15 is a block diagram of the circuitry of the power supply and control unit of FIG. 1

Referring to FIG. 15, the power supply unit 100 includes a power supply portion 110 which supplies power to the soldering device 20 via connector 104. The power supply portion 110 includes a transformer and its associated electrical equipment. The power supply portion 110 is connected to external power source via said power switch 105 and power cord 115.

Further, the power supply unit 100 includes a power supply control portion 111. The power supply control portion 111 is embodied on an integrated circuit (IC) board that controls the voltage which the power supply portion 110 outputs to the soldering device 20. The IC board includes a micro-processor, nonvolatile memory, and power supply line 116. The power supply line 116 is connected to the connector 104. The power supply control portion 111 controls the voltage supplied from the power supply portion 110 based on the temperature setting signal T(s) input from the control unit 200. Further via the connector 104, the signal necessary for feedback control is generated. The signal required for feedback control includes temperature signal F(i) showing the heating temperature based on the output of the soldering device 20, and indication signal IDs indicating the type of the soldering device 20. The generated signal is transmitted to the control unit 200 via connector 108. The control unit 200 runs a feedback process based on the transmitted signal.

As described above, various type of soldering device 20 (20a to 20e) may be connected to the power supply unit 100. However, the voltage output from the power supply needs to be set individually depending on the respective type of soldering device 20. Therefore, for the control unit 200 to identify the type of soldering device 20 connected to the power supply unit 100, the power supply line 116 of the power supply unit 100 includes an identification circuit (not shown). The identification circuit detects the voltage for identification when the soldering device 20 is connected. The identification circuit is configured so that when the connecter 23 of the soldering device 20 is connected to the connector 104 and the power switch 105 is turned on, the identification current of a specific voltage depending on the type of soldering device 20 may be determined. This voltage value is output to the control unit 200 as an identification signal IDs.

Power supply unit 100 also includes a communication control portion 112. The communication control portion 112 is an example of the element of power supply side communication member according to the invention. The communication control portion 112 is connected to the I/O device 120. The I/O device 120 may be a module which is provided on a circuit board included in the power supply unit 100.

The I/O device 120 is communicatively connected to the communication control portion 112. The I/O device 120 is an interface device that serves as a communication between the control unit 200 and the power supply unit 100. Together with the communication control portion 112, the I/O device 120 is an example of the power supply side communication member according to the invention. The connector 108 is connected to the I/O device 120.

Power supply unit 100 logically configures the receiving signal processing portion 113. Receiving signal processing portion 113 is a module that is embodied in a program which outputs the temperature setting signal T(s) received from the communication control portion 112 via the I/O device 120, to the power supply control portion 111.

Power supply unit 100 logically configures the transmitting signal processing portion 114. Transmitting signal processing portion 114 is a module that is embodied in a program which activates the communication control portion 112 to transmit the signal generated by the power supply control portion 111 to the control unit 200. The transmitting signal processing portion 114 is configured to be capable of transmitting signals, such as identification signal IDs and temperature signal F(i). Also in order to achieve control as described below, the transmitting signal processing portion 114 is configured to output identification signal MC1 showing the MAC address of the IC board configuring such as the power supply control portion 111 from the power supply unit 100, to the control unit 200 as identification information.

When the power supply unit 100 and the control unit 200 are connected by a cable, I/O device 120 is the communication member 30, a cable connecting between the connector 108 and 206. In this case, the receiving signal processing portion 113 and transmitting signal processing portion 114 of the power supply unit 100 side may be omitted, and the receiving signal processing portion 217 and transmitting signal processing portion 218 of the control unit 200 are directly input to the power supply control portion 111 via I/O device 120 and the communication control portion 112 of the power supply control portion 111.

The control unit 200 is provided with an IC board including microprocessor, nonvolatile memory and the like. With this IC board, a control program is stored in the nonvolatile memory along with various data, whereby the control unit 200 logically configures various modules described below.

The control unit 200 has an area for storing a judgment table in the nonvolatile memory. The judgment table is a data set that is used to call a program. For example, the judgment table according to the present embodiment has a data structure shown in the Table of FIG. 23.

In the following description, when referring to attributes of the judgment table as a data structure, it will be shown with { }.

Judgment table includes attribute such as {voltage of identification signal, soldering device, setting program}. {Voltage of identification signal} is an attribute that stores data to uniquely identify the type of soldering device. Data stored in the {voltage of identification signal} is used by a soldering device judgment portion 210 which will be described later. {Soldering device} is an attribute that stores a list of controllable soldering devices 20. The value for {voltage of identification signal} and the value for {soldering device} have a one-to-one relationship. Therefore, when the value of the identification signal IDs are determined, it is possible to specify the soldering device 20 according to its identification signal IDs. {Setting program} is an attribute that stores the name of the setting program determined by each of the soldering device 20 respectively. The setting program is stored in the memory for each of the compatible soldering devices 20, and runs by calling the setting program selection 211 described below.

An error trap program is configured to activate the notification device (for example, buzzer) connected to the board to provide notice of an error to the operator, and shutdown the power supply.

Using setting temperature and offset as argument figure, each setting program is configured to output a return value as temperature setting signal T(s) adapted to each soldering device. Here, the offset is adjustment value determined by temperature "degrees centigrade" with respect to each soldering device, depending on the difference from the target value. The setting temperature and offset is input to the control unit 200 directly or via communication from an administration device 400 described later. The setting temperature and offset are parameters of the feedback control portion 212 described later.

The control unit 200 logically configures soldering device judgment portion 210. The soldering device judgment portion 210 is a module that uniquely identifies the type of soldering device 20. By comparing the value of the identification signal IDs input from the power supply unit 100 and the value of the identification signal IDs set in the judgment table, the soldering device judgment portion 210 identifies the type of soldering device 20 connected to the power supply unit 100 and selects and calls out the setting program (which is the substance of feedback control portion 212 described later) from the judgment table (FIG. 23).

The control unit 200 logically configures the setting program selection 211. The setting program selection 211 is a module to select the setting program from the judgment table based on the identification signal IDs input. By the setting program selection 211, for example, if the voltage is less than 1.5V, an error judgment occurs and the error trap program is called. In the same manner, if the voltage is 1.5V or greater but less than 2.5V, it is judged that the soldering iron is connected and the setting program for soldering iron is called. If the voltage is 2.5V or greater but less than 3.5V, it is judged that tweezers are connected and the setting program for tweezers is called. If the voltage is 3.5V or greater but less than 4.5V, it is judged that the desoldering iron is connected, and the setting program for a desoldering iron is called. If the voltage is 4.5V or greater but less than 5.5V, it is judged that the hot air rework is connected and the setting program for hot air rework is called. If the volt age is 5.5V or above, it is judged that there is no soldering device 20 connected, and the system is placed in a stand-by mode. The foregoing parameter values are exemplary, it would be readily understood that the upper and lower limits of each type of tool could be set to other parameters that would be programmed or set in advance in the control unit 200.

The control unit 200 logically configures the feedback control portion 212. The feedback control portion 212 is a module that generates temperature setting signal T(s) and adjusting signal A(s) associated with the feedback control. Based on the setting program selected by the setting program selection 211, the feedback control portion 212 output temperature setting signal T(s) or adjusting signal A(s) preferable to each type of soldering device 20. In the first stage of operation, the feedback control portion 212 generate the temperature setting signal T(s) based on the setting information Si which is the information regarding the conditions for determining the set temperature of the soldering device 20. Further, once the control starts, feedback control portion 212 generates adjusting signal A(s) based on the temperature signal F(i) output from the power supply unit 100, and the algorithm of the setting program. As will be described below, the adjusting signal A(s) is output to the power supply unit 100. The control unit 200 is configured to achieve feedback control in the power supply unit 100 by this adjusting signal A(s).

The control unit 200 logically configures history managing portion 213. Based on the identification signal IDs and identification signal MC1 output from the power supply unit, the history managing portion 213 is a module to generate history data of the operation history for each power supply unit and each soldering device.

The control unit 200 logically configures the lock portion 214. The lock portion 214 is a module to restrict access of the operator by a predetermined password. In the illustrated embodiment, access to the feedback control portion 212 is restricted (locked) in the default status. Therefore, even if operating the 203 to 205 operation button, the setting information S(i) could not be entered, update, or deleted to the feedback control portion 212. However, it may be made so the lock releases by the lock portion 214, by operating the 203 to 205 in predetermined condition or sequence. Normally, the lock portion 214 is operated by an administration device 400 as a master unit described later, and the lock gets released. The locked status or the lock released status by the lock portion 214 is updated sequentially, for example by a Boolean flag (hereinafter referred as lock flag). The value of the lock flag is, for example "True" at the locked status and "False" at the lock released status. Therefore, by referring to the value of the lock flag, device capable of communicating with the control unit 200 can identify if the control unit 200 is in the locked status or not.

Control unit 200 logically configures the firmware control portion 215. The firmware control portion 215 is configured with a program to install the firmware program distributed from the administration device 400, by a distribution function described later.

The control unit 200 logically configures a communication control portion 216. The communication control portion 216 is an example configuring the element of the control side communication member according to the invention. The communication control portion 216 is connected to the I/O device 220. The I/O device 220 is an interface device provided on the circuit board configuring the control unit 200. Together with the communication control portion 216, the I/O device 220 is an example configuring the element of the control side communication member according to the invention.

The control unit 200 logically configures a receiving signal processing portion 217. The receiving signal processing portion 217 is a module embodied by a program to output the signals, like the identification signal IDs, temperature signal Fi, and identification signal MC1 received by the communication control portion 216 via I/O device 220, to the required module The control unit 200 logically configures a transmitting signal processing portion 218. The transmitting signal processing portion 218 is a module embodied by a program to activate the communication control portion 216, so as to transmit the temperature signal T(s) and adjusting signal A(s) generated by the feedback control portion 212, to the control unit 200.

Figure 16:
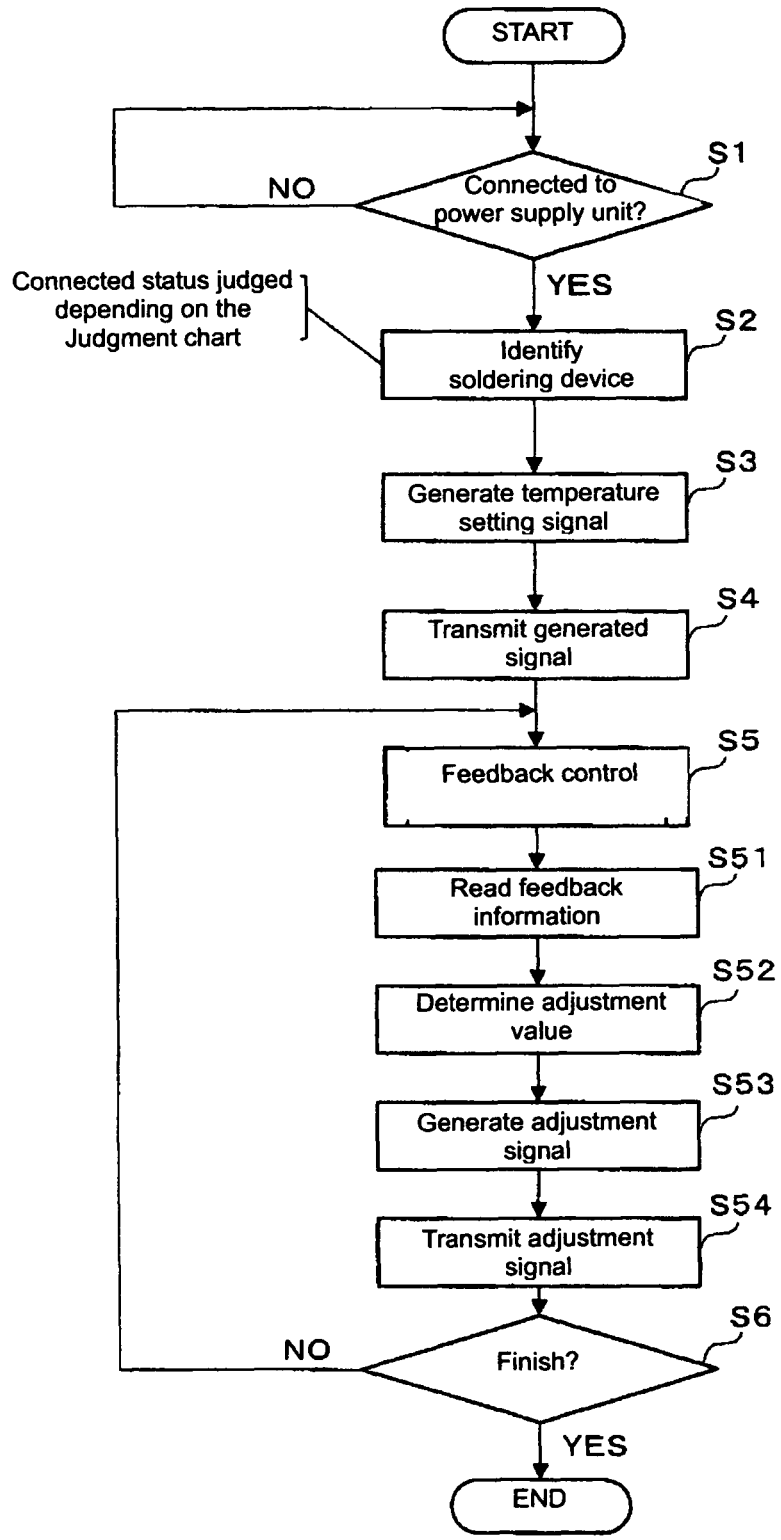
FIG. 16 is a flowchart showing the operation of the power supply and control unit of FIG. 1

Referring to FIG. 16, the basic logic of the control unit 200 is explained.

First, the control unit 200 is in a stand-by mode waiting to be connected to the power supply unit 100 (STEP S1). Specifically, it outputs signal such as by PING software to the power supply unit 100, and waits for a response. If no response, then it is determined that it is not connected, and if there is a response, it reads the MAC address and identifies the power supply unit 100 individually.

Next, the control unit 200 identifies the type of soldering device 20 connected to the power supply unit 100 (STEP S2). By having the power supply unit 100 connected, the identification signal IDs is input to the control unit 200 from the power supply unit 100. From the voltage of this identification signal IDs and the identification information shown in the judgment table of FIG. 23, the control unit 200 is able to identify what type of soldering device 20*a* to 20*e* is connected.

Next, the control unit 200 generates a temperature setting signal T(s) based on the set temperature and offset compatible with the connected soldering device 20. (STEP S3)

Then, the generated temperature setting signal T(s) is outputted from the control unit 200, and is transmitted to the power supply unit 100 (Step S4). The receiving signal processing portion 113 of the power supply unit 100 receives the temperature setting signal T(s) transmitted from the control unit 200, and outputs to the power supply control unit 111. On the basis of the temperature setting signal T(s), the power supply control portion 111 determines the output voltage. Based on the determined output voltage, the power supply portion 110 provides power to the soldering device 20. When soldering device 20 is powered, the heating unit generates heat and the temperature is detected by the temperature sensor (not shown). A temperature signal F(i); information about the detected temperature, is output to the control unit 200 by the communication control portion 112.

The control unit 200 receives a temperature signal F(i), controlled by receiving signal processing portion 217. Based on the received temperature signal Fi, the control unit 200 executes the feedback control (step S5). Specifically, the feedback control 212 reads the temperature signal (step S51), and determines the adjustment value. (step S52). Based on the determined adjustment value, the feedback control unit 212 generates an adjustment signal A(s) (step S53). Generated adjustment signal A(s) is output to the power supply unit 100 by transmitting signal processing portion 218 activating the communication control portion 216 (step S54). The Adjustment signal A(s) is received by the power supply unit 100 via communication control portion 112, and input to the power supply control portion 111. Based on the Adjustment signal A(s), the power supply control unit 111 controls the voltage output from the power supply unit 110

Control unit 200 executes the feedback control until the power supply unit 100 finishes the operation (step S6). The operation completion of the power supply unit 100 is determined whether the session of the power supply unit 100 is cut off or there is no transmission of the signal from the power supply unit 100 for a predetermined time.

Thus, as shown in FIGS. 1 and 14, even if the control unit 200 and the power supply unit 100 are physically separated and enabled to be used physically independently, the temperature control of soldering device 20 with feedback control can be executed.

Next, a further example of the use of the soldering system 10 is described according to the present embodiment.

Figure 17:
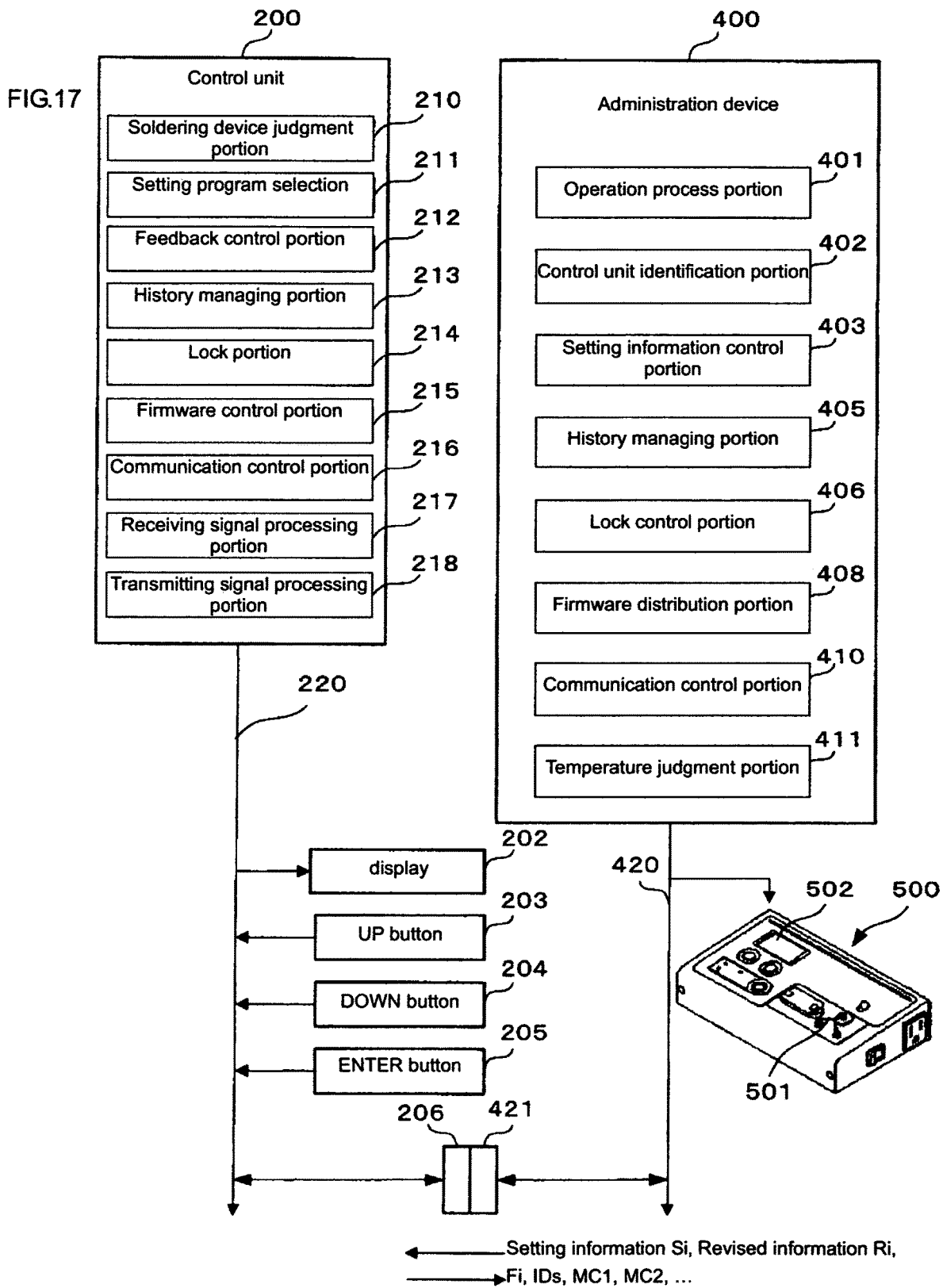
FIG. 17 is a block diagram showing the connection between an administration device and the control unit of FIG. 1

Carrying control unit 200 as single unit becomes easier due to physical separation and independent operation of the control unit 200 and the power supply unit 100. Therefore, an operator may carry the control unit 200 and the soldering device 20 to the administrator to connect to an administration device 400 which can be operated only by the administrator to audit the set temperature. FIG. 17 shows such a configuration by way of an example.

Referring to FIG. 17, the administration device 400 comprises the microprocessor, non-volatile memory, I/O device, various programs and drivers thereof. With the hardware and software thereof, the administration device 400 logically configures a module as below.

Administration device 400 configures operation process portion 401 logically. Operation process portion 401 is a module for managing the operation process to be requested at the factory that administration device 400 is equipped Administration device 400 configures the control unit identification portion 402 logically. The control unit identification 402 is a module for uniquely identifying the control unit 200 which is connected on a basis of identification signal MC2 representing a MAC address of the control unit 200.

Administration device 400 configures setting information control portion 403 logically.

Figure 22:
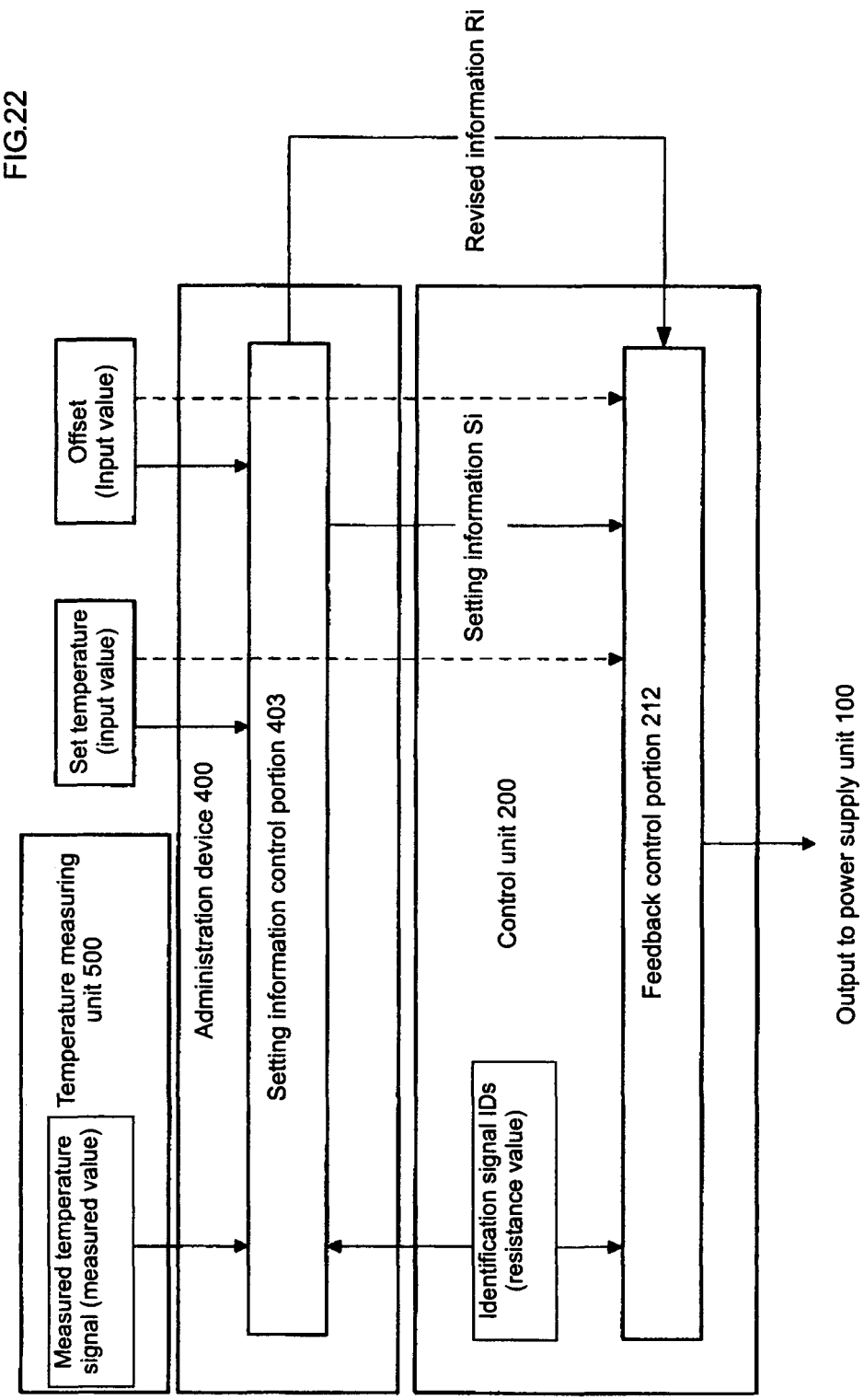
FIG. 22 is an illustrative view block diagram showing the signal system of the input/output (I/O) relationship of the preferred embodiment.

Referring to FIG. 22, setting information control portion 403 is a module for processing new set values, update or delete the values of variables for the setting program which is set in the control unit 200.

The setting information control portion 403 is also a module for correcting the values of variables used in the setting program of the control unit 200.

Referring to FIG. 22, for the setting information control portion 403 the set temperature and the offset may be inputted. First, the set temperature is determined by the administrator, and is inputted. Then, based on the measured temperature signal which is outputted by a temperature measuring unit 500 described hereinafter, the value of the actual temperature of the soldering device 20 may be read. Then, based on the set temperature and the measured temperature value, the offset is determined, and the offset is inputted. The offset may be calculated as a deviation from the target value by the setting information control portion 403. The set temperature and offset is inputted in the feedback control 212 of the control unit 200 through communication, and becomes an argument figure of the setting program which constitutes feedback control 212.

With reference to FIG. 17 again, the administration device 400 logically configures a history managing portion 405. The history managing portion 405 is a module that reads the history information output from the history management portion 213 of the control unit 200, to aggregate the history information for each control unit 200, power supply unit 100 and the soldering device 20.

The administration device 400 logically configures the lock control 406. The lock control 406 stores each password of the control unit 200. Therefore, by transmitting the password, it is possible to control the lock/unlock by the lock 214 of the control unit 200. The lock control 406 is configured to control the lock/unlock by the lock 214 of the control unit 200 when connecting to the control unit 200. Further, the lock control 406 has a function of outputting a command which operates the "unlocked" lock 214 to a "locked" state.

The administration device 400 logically configures the firmware distribution portion 408. Firmware distribution portion 408 is a module for distributing firmware programs that configure a feedback control 212 (i.e., setting program) of the control unit 200. Firmware control portion 215 of the control unit 200 makes new settings or updates the firmware by running (installing) the firmware program that has been distributed. Depending on the type of the soldering device 20, changing the algorithm used to change the parameters is more suitable than merely changing the parameters of the set temperature. Therefore, the present embodiment is configured, to allow setting or changing of the firmware of the control unit 200 by the administration device 400.

The administration device 400 configures communication control portion 410, logically. The communication control portion 410 is an example of a main part of the main side communication member of the present invention. The communication control portion 410 is connected to the I/O device 420. I/O device 420 is an interface device constituting the administration device 400. Together with the communication control portion 410, I/O device 420 is an example of a main part of the control side communication member of the present invention. The I/O device 420 is connected to the connector 421. The connector 421 is set to a connectable specification to the connector 206 of the control unit 200. Through the connector 421, by the program configuring the communication control portion 410, it enables receipt of the transmitted signal by control unit 200 or transmit setting information S(i) with a predetermined protocol. Connector 421 is an example of the main connector of the present invention.

Administration device 400 configures temperature judgment portion 411 logically. The temperature judgment portion 411 is module to determine appropriateness of the set temperature based on the measured result by the temperature measuring unit 500 of the soldering device 20. The determination result of the temperature judgment portion 411 is adapted to be reflected on the control of the setting information control portion 403.

In order to measure the temperature of the soldering device 20, the temperature judgment portion 411 is connected to the temperature measuring unit 500 via the I/O device 420. The temperature measuring unit 500 includes a thermocouple 501 which is brought into contact with the heating portion of the solder apparatus 20, an arithmetic operation portion that executes arithmetic calculation of the temperature based on the heat transferred from the thermocouple 501, and a display unit for displaying the arithmetic operation result of the arithmetic operation unit. The arithmetic operation unit is connected to a temperature determination unit 411 via the I/O device 420 of the administration device 400. Therefore, the arithmetic operation result of the arithmetic operation unit is inputted to a temperature judgment portion 411.

Figure 18:
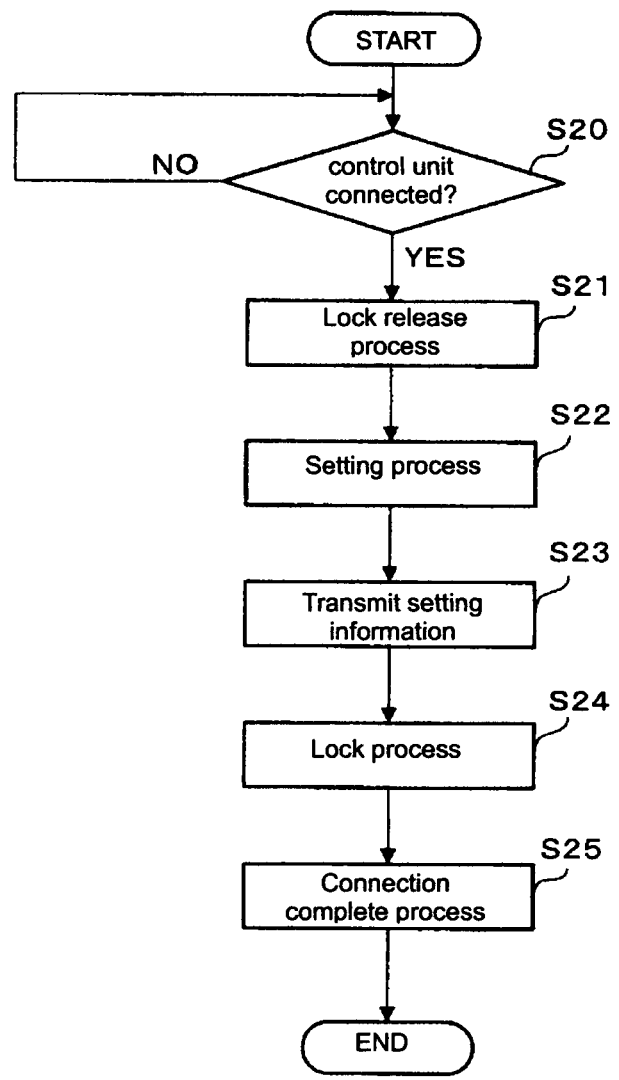
FIG. 18 is a flowchart showing the operation of the administration device when the administration devices is setting or updating the setting information of a control unit.

Next, an example usage for the configuration of FIG. 17 will be described with reference to the flowchart of FIGS. 18 and 19. According to the configuration of FIG. 17, at the operation start time, the operator visits to an administrator and passes the control unit 200. The administrator receives the control unit 200, and connects the connector 206 of the control unit 200 to the connector 421 of the administration device 400. This connection establishes communication between control unit 200 and administration device 400.

The administration device 400 waits for control unit 200 to be connected 400 (step S20). When the communication is established between the control unit 200 and administration device 400, the administration device 400 performs an unlocking operation (step S21). In the unlocking process, the lock control unit 406 uniquely identifies the control unit 200 on the basis of the identification signal MC2 (MAC address) of the control unit 200. Then, the password is transmitted to the lock 214 of the control unit 200. If the pass word is authentic, the lock 214 releases the locked state. When the locked state is released, the lock flag is also updated. The administration device 400 identifies a release of the lock with referring to the value of the lock flag.

After the unlocking process is performed, the administration device 400 executes the setting process (step S22). This setting process may be implemented in various forms.

For example, by executing the program installed in the administration device 400, the setting process can be processed automatically. In that case, the administration device 400 performs setting and update of setting programs through setting information control portion 403. Thus, it is possible to set the control unit 200 as the administrator intended.

Further, in another embodiment, it is possible to adopt a method for the operator to manually operate operation buttons 203-205 of the control unit 200 connected to the administration device 400.

When the setting and updating for setting program is completed, the lock control 406 of the administration device 400 operates the lock control portion 406 of control unit 200 (step 24). Because of this, the control unit 200 became a locked state again. At this point, setting operation completes. Thereafter, in order to prevent damage to data or programs, the administration device 400 executes the predetermined connection completion process (step S25). By this, the process within the administration device 400 is completed. After setting operation is completed, the administrator removes the control unit 200 and passes it to the worker.

After the setting operation is completed, the operator brings the control unit 200 back to the work bench 1 and connects the control unit 200 to the power supply unit 100 by a communication cable 30 as shown in FIG. 1. After that, the operator mounts the control unit on a stand 300. Thus, it is possible to view the control unit 200 at a distance from the power supply unit 100, and start operation.

Figure 19:
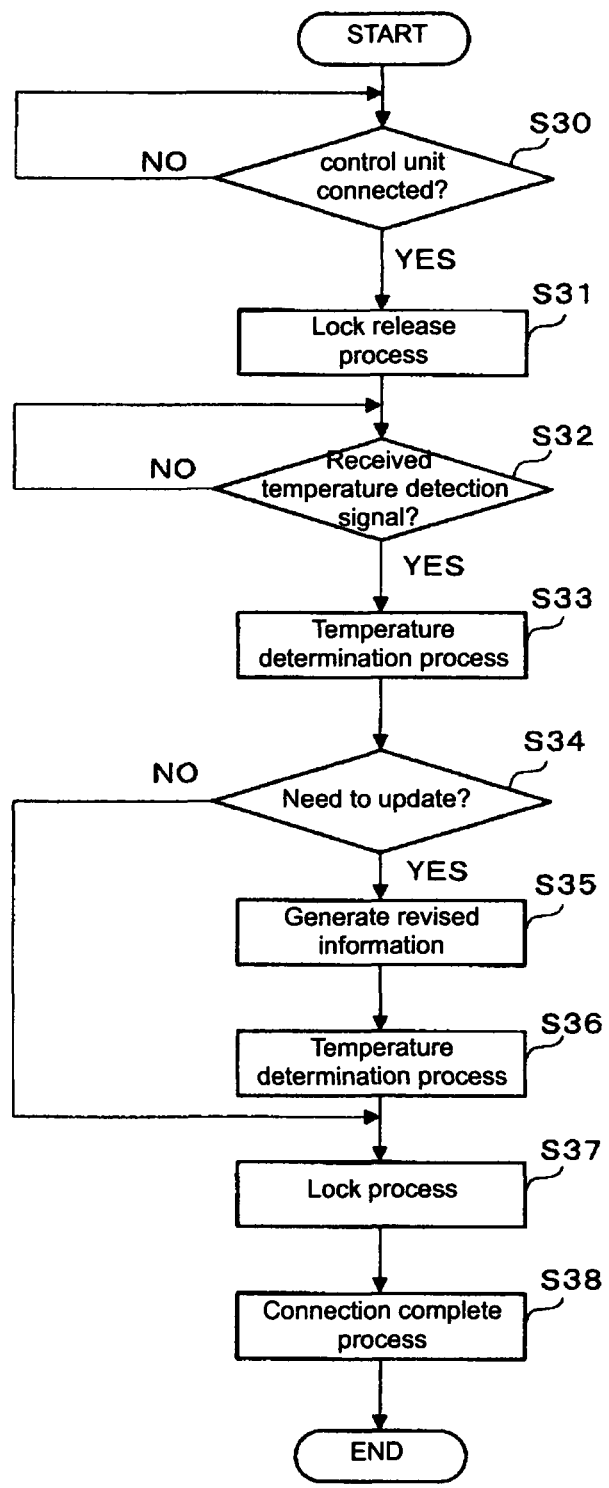
FIG. 19 is a flowchart showing the operation of the administration device performing a temperature audit of a control unit.

Next, with reference to FIG. 17, FIG. 19, and FIG. 22, auditing of the soldering device 20 in use is explained.

At a certain occasion in the solder handling work, the operator removes the using soldering device 20 and control unit 200 from the power supply unit 100, carries these to the administrator again. The administrator receives the control unit 200 and couples it to the administration device 400.

The administration device 400 is waiting for control unit 200 to be connected. (step S30). When the connection is detected, the lock control portion 406 of administration device 400 operates the lock 214 of the control unit 200 and releases the lock (step S31).

Also the administrator receives the soldering device 20 from the operator, and measure the temperature of soldering device 20 by applying the heating portion to a thermocouple 501 of a temperature measuring unit 500. This process makes it possible to audit whether the soldering device 20 operates at predetermined temperature.

After the lock is released, the administration device 400 is waiting for a temperature detection signal input from the temperature measuring unit 500 (StepS32). When the temperature detection signal is inputted, the administration device 400 executes the temperature determination processing (step S33). At this temperature determination process, the setting temperature and offset is inspected with a predetermined algorithm, and the necessity of correction is determined (Step S34). When the correction is determined to be needed, the administration device generates updated information R(i) (Step 35). Next, the administration device 400 executes the updating process (Step 36). This updating process includes updating the setting temperature and offset value that defined in the setting program of the control unit 200. After the updating process is completed, again, the administration device 400 executes the locking process (Step37), then finishes the operation after executing the connection completion processing (Step38). When it is determined that the correction is not needed in the step 34, the administration device proceeds to Step 37 immediately and performs the locking operation (Step S37).

The steps from S33 and S36 may be a manual processing by the administrator. The locked state of the control unit 200 is released when it is connected to the administration device 400. If necessary, the administrator manipulates the buttons 203-205 of the control unit 200, executes the processes from the step S33 to S36 manually, and can change the offset and the setting temperature defined in the setting program.

After the audit operation, the operator returns the control unit 200 and soldering device 20 to the work bench, connects the control unit 200 and soldering device 20 to the power supply unit 100, and installs the control unit 200 to the stand 300 and resumes the operation. This makes the audit operation very simple.

Incidentally, the solder handling operation is sometimes performed using a relatively large number of personnel. Further, sometimes each operator individually uses a different soldering device 20. In such a case, it is preferred to set or update installed firmware simultaneously in the control unit 200. However, conventionally, the administrator carries the unit for updating firmware and executes the updating of firmware of each power supply unit 100. Therefore, it has been a time consuming and troublesome to update firmware.

Figure 20:
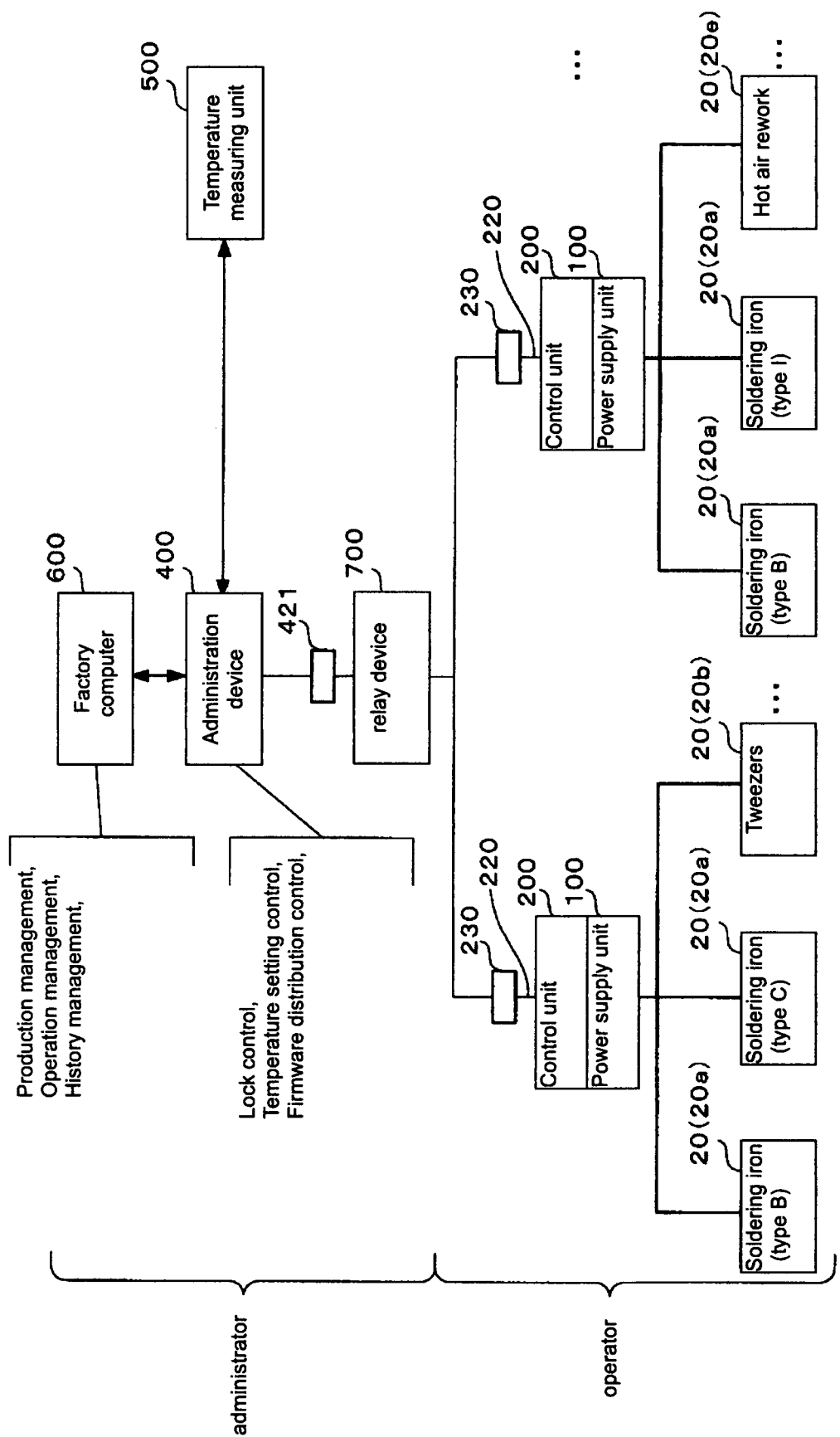
FIG. 20 is a connection diagram showing an embodiment of a system built with the administration device of FIG. 17 and power supply and control unit of FIG. 1

In contrast, in the present embodiment, the control unit 200 with an I/O device for communication are used, it is also possible to construct a client-server system using the control unit as a node by connecting the control unit 200 to the network. FIG. 20 shows such a construction example In the example of FIG. 20, a client-server system is built with the factory computer 600 and administration device 400 being on the server side, and control unit 200 being the client side.

Factory computer 600 is configured to process various databases, and process production management, operation management, and history management based on each database. The factory computer 600 is connected to the administration device 400, and provides a variety of data which the administration device 400 requests.

Administration device 400 as a server executes the firmware update process based on the information provided from the factory computer 600.

Each administration device 400 and control unit 200 are provided with a communication connector 230 connected to the I/O device 220. Communication connector 230 is communicatively connected to the administration device 400 via the relay device 700. The relay device 700 is exemplified as a hub or router.

In the configuration example shown in FIG. 20, for example, by having the factory computer 600 as a database server, and the administration device 400 as an application server (distribution server), it is possible to deliver the firmware individually or simultaneously to each control unit as a node, and automatically change to the suitable firmware to meet the needs of the control unit 200. Further, it is possible to ensure the traceability of the solder handling operation which is carried out at the work bench 1, based on data that is built in a factory computer 600.

As an operation method for keeping the traceability may comprise identifying the identification number (e.g., serial number) of each soldering work by a bar code reader (not shown), with an input directly or indirectly to the control unit 200. In that case, it may be configured to transmit the information read by the barcode reader to the control unit 200 using the communication function of power supply unit 100. Alternatively, the history managing portion 213 of the control unit 200 may be configured to store data in association with a control target like working time of the soldering device 20. Thus, it is possible to keep the traceability associating the information of soldering device 20 installed on the work bench 1 with the power supply unit 100 and the soldering work piece.

Figure 21:
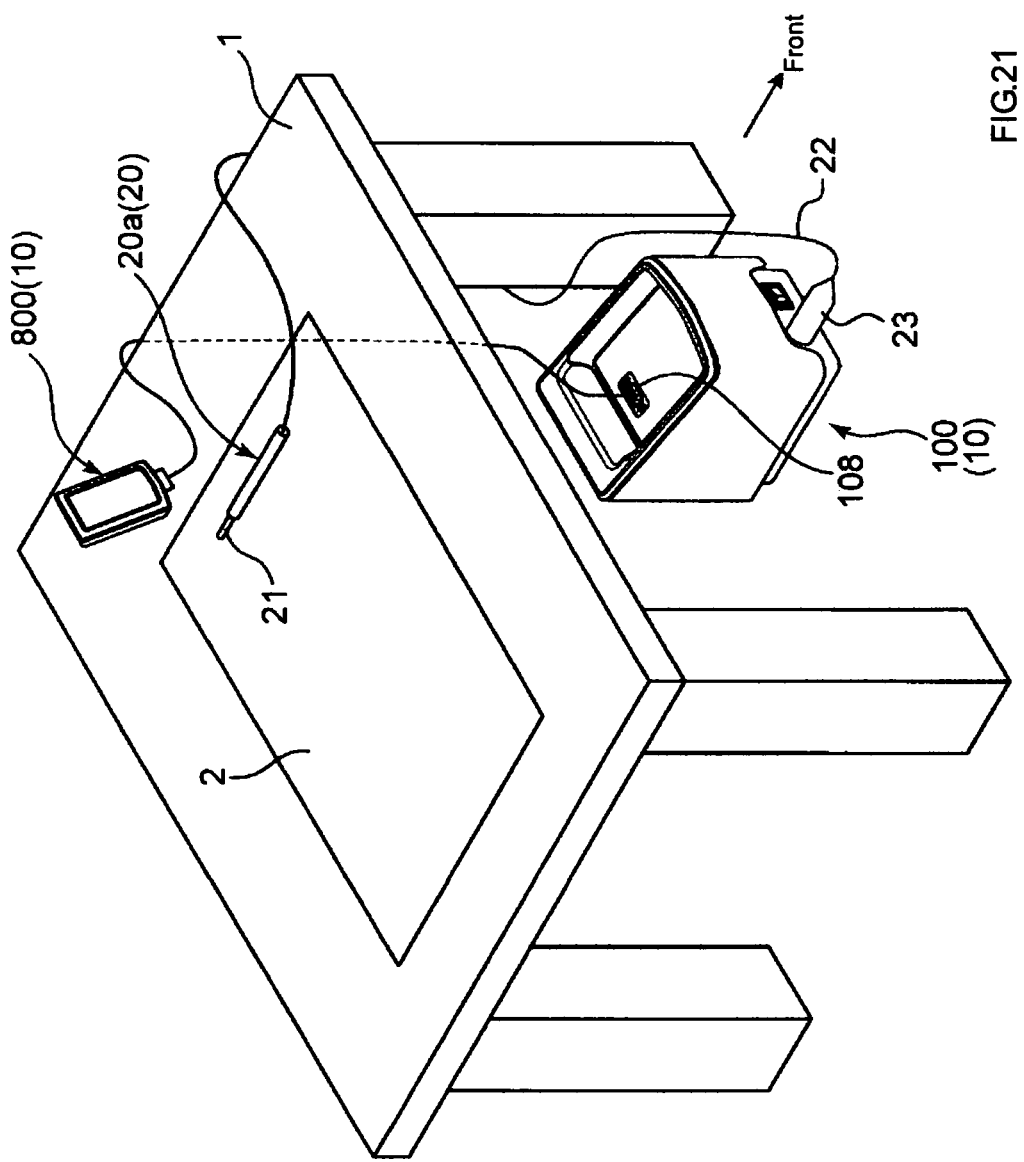
FIG. 21 is a perspective view showing the power supply unit of FIG. 1 controlled by a mobile phone.

Further, the control unit 200 can control the power supply unit 100 based on data processing if there is a communication function with the power supply unit 100. Thus, by providing a communication function to the power supply unit 100, a mobile phone 800 can be programmed to be the control unit, and perform the temperature control of the soldering device 20 as shown in FIG. 21. In this case, the communication unit 30 may have a configuration that employs a communication protocol of the mobile phone.

As explained above, the present embodiment relates to a soldering system 10 having a power supply unit 100 and a control unit 200 The power supply unit 100 includes a connector 104 as a connecting portion to be connected to the soldering device 20. Power supply unit 100 includes a power supply portion 110 for supplying power to the soldering device 20 through the connector 104. The power supply unit 100 includes a power supply control portion 111 providing power on the basis of the temperature setting signal T(s) that is set in advance for controlling the voltage (in this embodiment) feed that is output from the power supply unit 100. In this embodiment, a device which may be separated from the power supply unit 100 physically may still transmit the temperature setting signal T(s) which provides the temperature setting. For example, the device may be the power supply unit 200 or mobile phone 800. Power supply unit 100 is equipped with I/O device 120 and communication control portion 112 as a power supply-side communication unit which controls communication with the device. Power supply unit 100 includes a reception signal processing unit 113. The receiving signal processing portion 113 inputs the signal to the power supply control portion 111, which the communication control portion 112 received from the control unit 200. Thus, in the present embodiment, the power supply unit 100 can supply power to the soldering device 20 connected to the connector 104 based on the control of the power supply control portion 111. The power supply control portion 111 controls the power supply based on the temperature setting signal T(s) that is set in advance. The temperature setting signal T(s) is outputted from the control unit 200 as a device physically separated from the power supply unit 100, and output a temperature setting signal T(s). Outputted temperature setting signal T(s) is inputted to the power supply control unit 111 via the I/O device 120. Therefore, the device for outputting a temperature setting signal T(s) does not need to be in the same location as a power supply unit 100. Therefore, as shown FIG. 1, FIG. 12, FIG. 14, FIG. 21, it is possible to install the power supply unit 100 at a place separated from the work bench 1.

Further, the power supply unit 100 according to the present embodiment includes the transmitting signal processing portion 114 for operating the communication control portion 112 and the I/O device 120 so the power supply control portion 111 can output the output signal to control unit 200. The receiving signal processing portion 113 and the transmitting signal processing unit 114 function cooperatively to operate the communication control portion 112 and I/O device 120 so that the power supply control portion 111 control the power supply portion 110 based on the feedback control by control unit 200. With this feature, the control unit 200 is able to collect a variety of information, including the information necessary for feedback control of the voltage, and use the information for subsequent control. Therefore, in the present embodiment, it is possible between the power supply unit 100 and control unit 200, to realize the feedback control. Further, the control unit 200 may correspond to any soldering devices 20 connected to the power supply units 100 (in other words, correspond to any power supply unit 100) to achieve a suitable feedback control. As described above, the power supply unit 100 may be connected with various soldering devices 20. For example, a pump is required in case the soldering device 20 is a desoldering iron 20*d* or hot air rework 20*e*. On the other hand, a pump or similar component is not required in case the soldering device 20 is a soldering iron 20*a*. Because the presence or absence of additional components that may affect the control, depending on the grade or quality of the products, there are inexpensive ones specializing in a specific solder device 20, or expensive ones having broad utility, it is believed that there might be many variations to be provided to the user. Even in such a case, in the present embodiment, the transmitting signal processing portion 114 has functionality to operate communication control portion 112 and I/O device 120 to output the identification signal IDs of soldering device 20 which is connected to the connecting portion 104, to the control unit 200. This allows a control unit 200 to correspond to any power supply unit 100 as its own. Therefore, conventionally, whereas relation of the power supply portion and the control portion is a one-to-one, in this embodiment, the relation of the power supply unit 100 and the control unit 200 can be one-to-one, one-to-many, many to one, and many to many.

Further, within the power supply unit 100 according to the present embodiment, the transmitting signal processing portion 114 has function to operate communication control portion 112, and I/O device 120 so as to output the identification signal IDs of soldering device 20 which is connected to connecting portion 104 to the control unit 200. Specifically, the power supply unit 100 includes a connector 104. Each connector 104 is configured to be connected to a soldering device 20, each having the connector 23 which is set to a uniform specification. Power supply unit 100 includes a transmitting signal processing portion 114. The transmitting signal processing portion 114 has a function to output an identification signal IDs of the connected soldering device 20 to the control unit 200. In the present embodiment, depending on the type of the soldering operation, it is possible to connect the appropriate soldering device 20.

In addition, as to the information required for traceability, since the control unit 200 can receive an identification signal IDs of the solder apparatus 20, regardless of types of the power supply unit 100 (either exclusive one or general purpose one), it can identify the solder device 20 and can manage the history information. Therefore, it is possible to ensure reliable traceability without being affected by the difference of the solder device 20 (or the power supply unit 100).

Moreover, the power supply unit 100 includes the housing 101, and the housing is provided with a recess 106 as the mounting portion for detachably mounting the control unit 200. Therefore, in the present embodiment, it is possible to configure the integrated soldering system 10 with the control unit 200 and the power supply unit 100. Further, by separating the control unit 200 from the power supply unit 100, a wide working space can be maintained because the control unit 200 may be installed in a location with good visibility while the power supply unit 100 is installed in a position separated from the working space.

Further, another aspect of the present embodiment is the unique control unit 200. The control unit 200 is a device that acts as a device for outputting a temperature setting signal T(s), as a device physically separated from the power supply unit 100 described above, and output a temperature setting signal T(s) to the power supply unit 100. The control unit 200 includes I/O device 220 and a communication control unit 216 as the control side communication member which controls communication between the power supply unit 100. The control unit 200 includes a feedback control portion 212 that generates a temperature setting signal T(s) based on the setting information Si. The control unit 200 includes a transmitting signal processing portion 218. Transmitting signal processing portion 218 activates the communication control unit 216 so as to transmit the temperature setting signal T(s) generated by the feedback control portion 212 to the power supply unit 100. Therefore in the present embodiment of the power supply unit 100, it is possible to output a temperature setting signal T(s) to the power supply unit 100, which is a reference voltage that the power supply unit 100 outputs to the soldering device 20. The temperature setting signal T(s) is generated by a setting information S(i). The setting information S(i) is information about conditions for determining the set temperature of the soldering device 20, as illustrated in table 1, like setting temperature, offset setting, and a variety of other factors.

Further, with the control unit 200 according to the present embodiment, the feedback control unit 212 includes a setting program (FIG. 23) to generate multiple types of temperature setting signal T(s) that suits multiple types of soldering device 20 (soldering iron 20*a*, tweezers 20*b*, micro tweezers 20*c*, desoldering iron 20*d*, and hot air 20*e*, etc.). Therefore, one control unit 200 can correspond to multiple varieties of soldering devices. Thus, control unit 200 can output the temperature setting signal T(s) according to the situations of multiple power supply units 100 corresponding to multiple soldering device 20, or one power supply unit corresponding to multiple soldering devices 20.

The control unit 200 according to the present embodiment further includes receiving signal processing portion 217 for receiving a signal transmitted from the transmitting signal processing portion 114 of the power supply unit 100. In the present embodiment, it is possible to achieve a suitable feedback control by the control unit 200 on the basis of various signals outputted from the power supply unit 100. Of course, feedback control it may also be provided with a module for performing a feedback process in the feed control portion 111 of the power supply unit 100.

The control unit 200 according to the present embodiment may be equipped with a lock 214 to control the setting or changing of the setting information S(i) to feedback control portion 212. Therefore it is possible to apply an access restriction to the operator to allow only a specific operator or administrator the ability to set or change the setting information S(i) protected by the lock 214. Therefore, only the specific operator or administrator should be able to release the lock 214, and other operators can only use the power supply unit 100 to supply voltage to the soldering devices 20 based on the temperature setting signal T(s) generated by the setting information S(i) which is set by the administrator. Therefore, it is possible to ensure integrity of the setting information S(i).

The control unit 200 according to the present embodiment further includes a firmware control portion 215 to install a firmware program received via the I/O device 220 as firmware configuring the feedback control portion 212. Therefore, it is possible to execute the automatic update of the firmware upon receiving the transmission of a firmware program, making use of the communication function of the I/O device 220 and communication control portion 216.

The control unit 200 according to the present embodiment includes a history managing portion 213 for generating a historical data on manufacturing history with respect to each identification signal IDs of soldering device 20 that is outputted from power supply unit 100. Transmitting signal processing portion 218 includes a function for operating the communication control portion 216 and I/O device 220 as a communication member to output the history data to the device for performing the production management (for example, the administration device 400). Therefore, the control unit 200 can correspond to every soldering device 20 connected to the power supply unit 100, to achieve a suitable feedback control. In addition, it is possible to ensure reliable traceability regardless of the differences of soldering devices 20 (or the power supply unit 100) because the control unit 200 can receive the identification signal IDs of soldering device 20 as necessary information for tractability even in the situation that various types of soldering devices 20 (or the power supply unit 100) connected versatile to the control unit 200.

Further, another aspect of present embodiment relates to an administration device 400. The administration device 400 functions as a master unit of the control unit 200.

The administration device 400 according to the first embodiment includes the communication control portion 410 and the I/O device 420 as the main-side communication member which controls communication with the control unit 200. The administration device 400 includes setting information control portion 403 to set or update setting information S(i) for the feedback control unit 212 of the control unit 200. In the present embodiment, it is possible to change the setting information S(i) stored in the control unit 200 by the administration device 400 as the master unit. Alternatively, it becomes possible to constrain changeable items with the control unit 200 itself, or to set a common setting information S(i) for multiple control units 200, uniformly.

In a specific embodiment, other than the I/O device 420 and the communication control portion 410, administration device 400 according to the present embodiment includes a lock control portion 406 which can release the lock 214 of the control unit 200. The administration device 400 includes setting information control portion 403 to set or update the setting information S(i), to the feedback control 212 of control unit 200 via I/O device 420 when the lock of the lock portion 214 is released by lock control portion 406. Therefore in the present embodiment, with respect to lock 214, the operator who has access right can release the lock of the control unit 200 by using the administration device 400. That operator can set or update the setting information S(i) of the control unit 200 via setting information control portion 403 that outputs the updating information R(i).

The administration device 400 according to the present embodiment further includes a control unit identification portion determining whether control unit 200 is connected to the I/O device 420. A lock control portion 406 releases the lock 214 when the control unit is connected to the I/O device. Therefore in the present embodiment, by connecting the control unit 200 to the I/O device 420 of the administration device 400, the lock is released automatically, allowing execution of the setting or updating the setting information S(i) by the setting information control portion 403.

Further, with the administration device 400 according to the present embodiment, the lock control portion 406 has a function to return to the locked condition the lock 214 after setting or updating the setting information S(i) by the setting information control portion 403. Therefore, in the present embodiment, after a given process for control unit 200 is completed, automatically, it becomes impossible for an operator to release the lock 214. Thus, the integrity of the set (or updated) setting information S(i) in the control unit 200 is ensured.

Further, with the administration device 400 according to the present embodiment, I/O device 420, as shown in FIG. 20, may connect to at least one control unit 200 via a network. The administration device 400 is further provided with a firmware distribution portion 408 to deliver the firmware program to the control unit 200 via network. Therefore, in the present embodiment, it is possible to distribute the firmware simultaneously to single or multiple control units 200 via the network. Accordingly, the administrator can execute the updating of many control units 200 from the administration device 400. Firmware distribution portion 408 is an example of a distribution member. Besides the firmware, the administration device 400 may employ the configuration that can simultaneously deliver the data (set, update) such as various other parameters by providing a module (another example of a distribution member) which deliver setting information S(i) such as set temperature and offset.

The present invention is not limited to the embodiments described above, it may be modified in various ways without departing from the spirit and scope of the present invention.

As described herein, the numbered elements include:
1 work bench (installation location)
10 soldering system
20 soldering device
20a soldering iron (example of soldering device)
20b tweezers (example of soldering device)
20c micro tweezers (example of soldering device)
20d desoldering iron (example of soldering device)
20e hot air rework (example of soldering device)
23 connector
100 power supply unit
104 connector (an example of connecting part)
106 recess
108 connector
110 power supply portion
111 power supply control portion
112 communication control portion
120 I/O device
200 control unit
201 housing
202 display
203 UP/operation button (operation button)
204 DOWN/operation button (operation button)
205 ENTER/operation button (operation button)
206 connector
210 soldering device judgment portion
211 setting program selection
212 feedback control
215 communication control portion
220 I/O device
300 stand
301 main body
302 first end portion
303 second end portion
304 bent concave portion
305 side flange
309 holder
400 administration device
403 setting information control portion 406 lock control
408 firmware distribution portion
410 communication control portion (an example of main part of main side communication member)
411 temperature judgment portion
420 I/O device (an example of main part of main side communication member)
500 temperature measuring unit
800 mobile phone (another example of control unit)

What is claimed is:

1. A soldering system comprising:
a soldering station power supply unit connected to supply power to a soldering device;
a soldering control unit physically separated from said soldering station power supply unit, said soldering control unit including a microprocessor and a nonvolatile memory storing at least one temperature setting signal for said soldering device;
said soldering station power supply unit including a power supply transformer circuit and a power supply control circuit, wherein said power supply control circuit controls power supplied by said power supply transformer circuit based on a temperature setting signal provided by said solder control unit;
said soldering station power supply unit further comprising:
a power supply side communication member to receive the temperature setting signal from said control unit physically separated from said soldering station power supply unit, wherein said soldering control unit generates the temperature setting signal that is received by said power supply side communication member; and
when said power supply side communication member receives said temperature setting signal from the physically separated soldering control unit, said power supply side communication member is configured to input said temperature setting signal to said power supply control circuit; and
said soldering control unit configured to function physically separated from said soldering station power supply unit and the soldering control unit is further configured to communicate control instructions to the soldering station power supply unit, said soldering control unit further comprising:
a control side communication member providing communication with said soldering station power supply unit;
a feedback control portion including a firmware program generating said temperature setting signal based on setting information including a setting temperature and an offset to determine a setting temperature signal for said soldering device connected to said soldering station power supply unit;
a control side transmitting signal processing portion operating said control side communication member wherein the control side transmitting signal processing portion outputs said temperature setting signal generated by said feedback control portion to said soldering station power supply unit.

2. The power supply unit of the soldering system according to claim 1, further comprising:
a power supply side receiving signal processing portion which inputs said temperature setting signal to said power supply control circuit when said power supply side communication member receives said temperature setting signal from the physically separated soldering control unit.

3. The power supply unit of the soldering system according to claim 2, further comprising:
a power supply side transmitting signal processing portion for instructing said power supply side communication member so said power supply control circuit will output an output signal to said physically separated soldering control unit, wherein said power supply side receiving signal processing portion and said power supply side transmitting signal processing portion cooperatively operate the power supply side communication member so that said power supply control circuit will control said power supply transformer circuit based on feedback control provided by the physically separated soldering control unit.

4. The power supply unit of the soldering system according to claim 3, wherein said power supply side transmitting signal processing portion has functionality to operate said power supply side communication member to output an identification signal of a soldering device to said physically separated soldering control unit.

5. The soldering system according to claim 1, further comprising:
said power supply unit including a housing, wherein said housing provides a mounting portion to detachably mount said control unit.

6. The control unit of the soldering system according to claim 1, wherein said control unit includes said firmware program for generating multiple types of temperature setting signals respectively adapted to the soldering device.

7. The control unit of the soldering system according to claim 1, further comprising:
a firmware control portion to install said firmware program as said firmware program is received by said control side communication member.

8. The control unit of the soldering system according claim 1, further comprising:
a lock to lock the setting and changing of setting information of said feedback control portion.

9. The soldering system of claim 1,
wherein said control unit is configured to provide an output temperature setting signal to the physically separated power supply unit and provide feedback control to said power supply control circuit of said power supply unit, the control unit further comprising:
a history managing portion generating history data regarding production history for each identification signal of the soldering device outputted from said power supply unit through said control side communication member to said control unit.

10. The soldering system of claim 1, further comprising an administration device physically separated from both the power supply unit and the control unit for the soldering system, said administration device functioning as a master unit of said control unit, said administration device comprising:
a main side communication member providing communication with said control unit; and
a setting information control portion operating said main side communication member so as to output setting information to said feedback control portion of said control unit.

11. The soldering system of claim 8, further comprising an administration device for said soldering system functioning as a master unit of said control unit, said administration device physically separated from both the power supply unit and the control unit, and said administration device comprising:
- a main side communication member providing communication with said control unit;
- a lock control portion capable of releasing the lock of said control unit;
- a setting information control portion operating said main side communication member so as to output setting information to said feedback control portion of said control unit when said lock of said control unit is released.

12. The administration device for the soldering system according to claim 11, further comprising:
- a control unit identification portion to judge whether said control unit is connected to said main side communication member, wherein when the control unit identification portion judges that said control unit is connected to the main side communication member, said lock control portion releases said lock.

13. The administration device for the soldering system according to claim 11, wherein said lock control portion has a function to re-lock said lock after the setting of the setting information by said setting information control portion.

* * * * *